US012566542B2

(12) United States Patent
Stoller et al.

(10) Patent No.: US 12,566,542 B2
(45) Date of Patent: Mar. 3, 2026

(54) SYSTEMS AND METHODS FOR PROVIDING FIELD VIEWS INCLUDING ENHANCED AGRICULTURAL MAPS HAVING A DATA LAYER AND IMAGE DATA

(71) Applicant: Precision Planting LLC, Tremont, IL (US)

(72) Inventors: Jason Stoller, Eureka, IL (US); Ryan Knuffman, Tremont, IL (US)

(73) Assignee: Precision Planting LLC, Tremont, IL (US)

( * ) Notice: Subject to any disclaimer, the term of this patent is extended or adjusted under 35 U.S.C. 154(b) by 116 days.

(21) Appl. No.: 18/555,897

(22) PCT Filed: May 25, 2022

(86) PCT No.: PCT/IB2022/054916
§ 371 (c)(1),
(2) Date: Oct. 18, 2023

(87) PCT Pub. No.: WO2022/259072
PCT Pub. Date: Dec. 15, 2022

(65) Prior Publication Data
US 2024/0295954 A1 Sep. 5, 2024

Related U.S. Application Data

(60) Provisional application No. 63/269,693, filed on Mar. 21, 2022, provisional application No. 63/197,634, filed on Jun. 7, 2021.

(51) Int. Cl.
*G06F 3/048* (2013.01)
*A01B 79/00* (2006.01)
(Continued)

(52) U.S. Cl.
CPC ........ *G06F 3/04845* (2013.01); *A01B 79/005* (2013.01); *A01C 7/105* (2013.01); *G06F 3/04817* (2013.01)

(58) Field of Classification Search
CPC .................................................... A01B 79/005
See application file for complete search history.

(56) References Cited

U.S. PATENT DOCUMENTS

| | | | |
|---|---|---|---|
| 5,809,440 A | 9/1998 | Beck et al. | |
| 6,266,595 B1 | 7/2001 | Greatline et al. | |

(Continued)

FOREIGN PATENT DOCUMENTS

| | | |
|---|---|---|
| AU | 2019219731 A1 | 3/2020 |
| CN | 100416590 C | 9/2008 |

(Continued)

OTHER PUBLICATIONS

UK Intellectual Property Office, Search report for related UK Application No. GB2108558.4, dated Mar. 7, 2022, 4 pages.

(Continued)

*Primary Examiner* — Linh K Pham

(57) ABSTRACT

Described herein are systems and methods for providing field views of data displays with enhanced maps having a data layer and icons for image data overlaid on the data layer. In one embodiment, a computer implemented method for customizing field views of data displays comprises obtaining a data layer for an agricultural parameter from sensors of an agricultural implement or machine during an application pass for a field, generating a user interface with an enhanced map that includes the data layer for the agricultural parameter, and generating selectable icons overlaid at different geographic locations on the enhanced map for the field with the selectable icons representing captured images at the different geographic locations.

20 Claims, 24 Drawing Sheets

(51) Int. Cl.

| | | |
|---|---|---|
| *A01C 7/10* | (2006.01) | |
| *G06F 3/04817* | (2022.01) | |
| *G06F 3/04845* | (2022.01) | |

(56) References Cited

U.S. PATENT DOCUMENTS

| | | | | |
|---|---|---|---|---|
| 8,107,681 | B2 | 1/2012 | Jozsef | |
| 9,489,576 | B2 | 11/2016 | Johnson et al. | |
| 9,495,597 | B2 | 11/2016 | Hundley et al. | |
| 9,688,403 | B2 | 6/2017 | Winn et al. | |
| 9,792,557 | B2 | 10/2017 | Mathur et al. | |
| 9,922,405 | B2 | 3/2018 | Sauder et al. | |
| 9,961,833 | B2 | 5/2018 | Halmann | |
| 10,028,426 | B2 | 7/2018 | Schildroth et al. | |
| 10,068,354 | B2 | 9/2018 | Mentzer | |
| 10,120,543 | B2 | 11/2018 | Sugumaran et al. | |
| 10,318,810 | B2 | 6/2019 | Ritter et al. | |
| 10,621,780 | B2 | 4/2020 | Millin et al. | |
| 10,627,232 | B2 | 4/2020 | Pilkington et al. | |
| 10,645,917 | B2 | 5/2020 | Anderson et al. | |
| 10,755,367 | B2 | 8/2020 | Bones et al. | |
| 10,860,189 | B2 | 12/2020 | Allgaier et al. | |
| 10,977,494 | B2 | 4/2021 | Kiepe et al. | |
| 11,564,345 | B1 * | 1/2023 | Dharna | G06F 16/248 |
| 11,678,600 | B2 * | 6/2023 | Koch | A01C 5/068 |
| | | | | 172/4 |
| 11,844,311 | B2 * | 12/2023 | Vandike | A01D 41/1278 |
| 11,845,449 | B2 * | 12/2023 | Vandike | A01D 41/141 |
| 12,298,741 | B2 * | 5/2025 | Frank | G01F 15/005 |
| 2012/0139845 | A1 * | 6/2012 | Griffin | G06F 3/0238 |
| | | | | 345/173 |
| 2014/0089045 | A1 | 3/2014 | Johnson | |
| 2015/0206255 | A1 * | 7/2015 | Groeneveld | A01B 79/005 |
| | | | | 705/7.23 |
| 2015/0278966 | A1 | 10/2015 | Johnson | |
| 2017/0374323 | A1 * | 12/2017 | Gornik | H04N 23/685 |
| 2018/0368331 | A1 * | 12/2018 | Kurata | B60K 35/22 |
| 2019/0147249 | A1 * | 5/2019 | Kiepe | G06V 20/20 |
| | | | | 382/110 |
| 2019/0150357 | A1 | 5/2019 | Wu et al. | |
| 2019/0335674 | A1 | 11/2019 | Basso | |
| 2020/0019777 | A1 * | 1/2020 | Gurzoni, Jr. | G06V 10/803 |
| 2020/0193589 | A1 | 6/2020 | Peshlov et al. | |
| 2020/0225206 | A1 * | 7/2020 | Strnad | A01C 14/00 |
| 2020/0359559 | A1 * | 11/2020 | Koch | A01C 7/203 |
| 2021/0158041 | A1 | 5/2021 | Chowdhary et al. | |
| 2021/0256632 | A1 * | 8/2021 | Chiocco | G06Q 50/02 |
| 2022/0110254 | A1 * | 4/2022 | Vandike | A01B 79/005 |
| 2022/0110256 | A1 * | 4/2022 | Vandike | A01B 79/005 |
| 2022/0113730 | A1 * | 4/2022 | Vandike | B60K 35/22 |
| 2022/0172306 | A1 | 6/2022 | Tempel et al. | |
| 2022/0197256 | A1 * | 6/2022 | Frank | G01F 1/663 |
| 2022/0279704 | A1 | 9/2022 | Sharda et al. | |
| 2022/0346304 | A1 * | 11/2022 | Allgaier | A01B 67/00 |
| 2024/0276904 | A1 * | 8/2024 | Koch | A01C 7/203 |

FOREIGN PATENT DOCUMENTS

| | | | | | |
|---|---|---|---|---|---|
| ES | 2311322 | B1 | 11/2009 | | |
| ES | 2318930 | B1 | 2/2010 | | |
| IN | 202041031171 | A | 8/2020 | | |
| JP | 2022542764 | A * | 10/2022 | | G06F 18/24 |
| JP | 7471211 | B2 * | 4/2024 | | A01D 41/127 |
| RO | 130713 | | 11/2015 | | |
| WO | 2009153304 | A1 | 12/2009 | | |
| WO | 2015038751 | A1 | 3/2015 | | |
| WO | WO-2019099748 | A1 * | 5/2019 | | A01C 7/205 |
| WO | WO-2020031473 | A1 * | 2/2020 | | A01D 41/127 |

OTHER PUBLICATIONS

European Patent Office, Search report for related PCT Application No. PCT/IB2022/054916, dated Sep. 15, 2022, 12 pages.

* cited by examiner

300

| |
|---|
| INITIATE A SOFTWARE APPLICATION ON A COMPUTER SYSTEM (E.G., MACHINE, APPARATUS, USER DEVICE, SELF-GUIDED DEVICE, SELF-PROPELLED DEVICE, ETC) AND DISPLAY A USER INTERFACE ON A MONITOR OR DISPLAY DEVICE. |

302

| |
|---|
| RECEIVE, WITH THE SOFTWARE APPLICATION, USER INPUT, AND GENERATE AN UPDATED USER INTERFACE WITH AN ENHANCED MAP OF A DATA LAYER THAT IS DISPLAYED WITH THE MONITOR OR DISPLAY DEVICE. THE ENHANCED MAP INCLUDES THE DATA LAYER AND ICONS OR SYMBOLS POSITIONED ACROSS THE FIELD |

304

| |
|---|
| THE ICONS OR SYMBOLS ARE GENERATED BASED ON A USER DEFINED SPATIAL OR GRID BASED INPUT, A THRESHOLD TRIGGER THAT IS COMPARED TO AN AG PARAMETER, A TIME BASED TRIGGER, OR BURST CAPTURE OF IMAGES |

306

| |
|---|
| RECEIVE, WITH THE SOFTWARE APPLICATION A USER INPUT TO SELECT AN ICON OR SYMBOL OF THE ENHANCED MAP OF THE DATA LAYER |

308

| |
|---|
| GENERATE AN UPDATED USER INTERFACE BASED ON THE USER INPUT WITH THE SELECTED ICON CHANGING COLOR |

310

| |
|---|
| DISPLAY WITH THE MONITOR OR DISPLAY DEVICE THE UPDATED USER INTERFACE INCLUDING THE ENHANCED MAP HAVING THE SELECTED ICON AND AN IMAGE OF THE SELECTED ICON |

312

| |
|---|
| RECEIVE USER INPUT (E.G., EXPAND (POSITIVE EXPANSION, NEGATIVE EXPANSION OR CONTRACTION), PANNING OPERATION) TO MODIFY A SCALE OF THE SCALE REGION FOR THE AG PARAMETER. |

314

| |
|---|
| GENERATE ANOTHER MODIFIED SCALE REGION AND ALSO ANOTHER CORRESPONDING MODIFIED FIELD REGION BASED ON THE ADDITIONAL USER INPUT. |

Figure 20A:
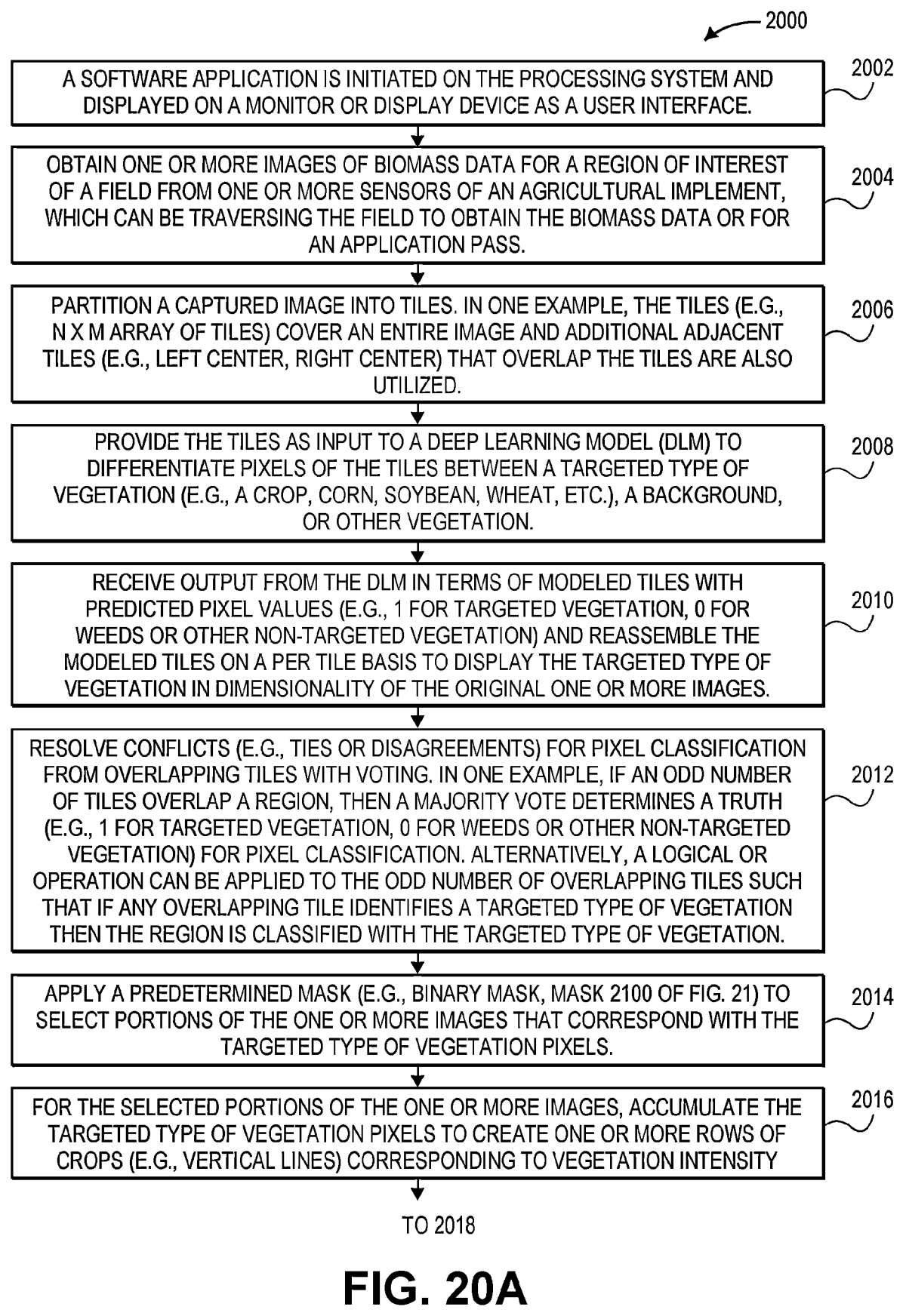

| A SOFTWARE APPLICATION IS INITIATED ON THE PROCESSING SYSTEM AND DISPLAYED ON A MONITOR OR DISPLAY DEVICE AS A USER INTERFACE. | 2002 |

| OBTAIN ONE OR MORE IMAGES OF BIOMASS DATA FOR A REGION OF INTEREST OF A FIELD FROM ONE OR MORE SENSORS OF AN AGRICULTURAL IMPLEMENT, WHICH CAN BE TRAVERSING THE FIELD TO OBTAIN THE BIOMASS DATA OR FOR AN APPLICATION PASS. | 2004 |

| PARTITION A CAPTURED IMAGE INTO TILES. IN ONE EXAMPLE, THE TILES (E.G., N X M ARRAY OF TILES) COVER AN ENTIRE IMAGE AND ADDITIONAL ADJACENT TILES (E.G., LEFT CENTER, RIGHT CENTER) THAT OVERLAP THE TILES ARE ALSO UTILIZED. | 2006 |

| PROVIDE THE TILES AS INPUT TO A DEEP LEARNING MODEL (DLM) TO DIFFERENTIATE PIXELS OF THE TILES BETWEEN A TARGETED TYPE OF VEGETATION (E.G., A CROP, CORN, SOYBEAN, WHEAT, ETC.), A BACKGROUND, OR OTHER VEGETATION. | 2008 |

| RECEIVE OUTPUT FROM THE DLM IN TERMS OF MODELED TILES WITH PREDICTED PIXEL VALUES (E.G., 1 FOR TARGETED VEGETATION, 0 FOR WEEDS OR OTHER NON-TARGETED VEGETATION) AND REASSEMBLE THE MODELED TILES ON A PER TILE BASIS TO DISPLAY THE TARGETED TYPE OF VEGETATION IN DIMENSIONALITY OF THE ORIGINAL ONE OR MORE IMAGES. | 2010 |

| RESOLVE CONFLICTS (E.G., TIES OR DISAGREEMENTS) FOR PIXEL CLASSIFICATION FROM OVERLAPPING TILES WITH VOTING. IN ONE EXAMPLE, IF AN ODD NUMBER OF TILES OVERLAP A REGION, THEN A MAJORITY VOTE DETERMINES A TRUTH (E.G., 1 FOR TARGETED VEGETATION, 0 FOR WEEDS OR OTHER NON-TARGETED VEGETATION) FOR PIXEL CLASSIFICATION. ALTERNATIVELY, A LOGICAL OR OPERATION CAN BE APPLIED TO THE ODD NUMBER OF OVERLAPPING TILES SUCH THAT IF ANY OVERLAPPING TILE IDENTIFIES A TARGETED TYPE OF VEGETATION THEN THE REGION IS CLASSIFIED WITH THE TARGETED TYPE OF VEGETATION. | 2012 |

| APPLY A PREDETERMINED MASK (E.G., BINARY MASK, MASK 2100 OF FIG. 21) TO SELECT PORTIONS OF THE ONE OR MORE IMAGES THAT CORRESPOND WITH THE TARGETED TYPE OF VEGETATION PIXELS. | 2014 |

| FOR THE SELECTED PORTIONS OF THE ONE OR MORE IMAGES, ACCUMULATE THE TARGETED TYPE OF VEGETATION PIXELS TO CREATE ONE OR MORE ROWS OF CROPS (E.G., VERTICAL LINES) CORRESPONDING TO VEGETATION INTENSITY | 2016 |

Figure 20B:
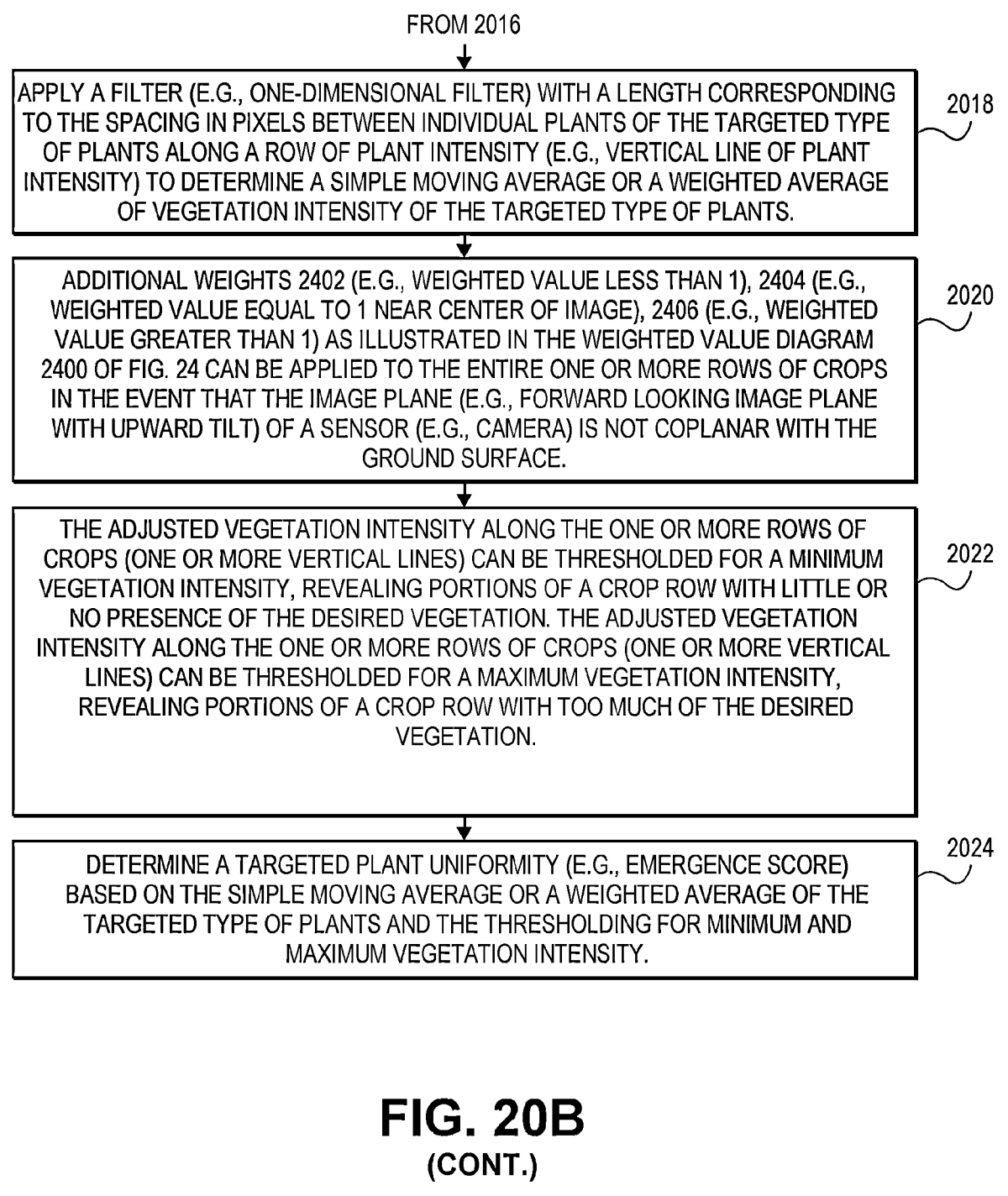

FROM 2016

APPLY A FILTER (E.G., ONE-DIMENSIONAL FILTER) WITH A LENGTH CORRESPONDING TO THE SPACING IN PIXELS BETWEEN INDIVIDUAL PLANTS OF THE TARGETED TYPE OF PLANTS ALONG A ROW OF PLANT INTENSITY (E.G., VERTICAL LINE OF PLANT INTENSITY) TO DETERMINE A SIMPLE MOVING AVERAGE OR A WEIGHTED AVERAGE OF VEGETATION INTENSITY OF THE TARGETED TYPE OF PLANTS. — 2018

ADDITIONAL WEIGHTS 2402 (E.G., WEIGHTED VALUE LESS THAN 1), 2404 (E.G., WEIGHTED VALUE EQUAL TO 1 NEAR CENTER OF IMAGE), 2406 (E.G., WEIGHTED VALUE GREATER THAN 1) AS ILLUSTRATED IN THE WEIGHTED VALUE DIAGRAM 2400 OF FIG. 24 CAN BE APPLIED TO THE ENTIRE ONE OR MORE ROWS OF CROPS IN THE EVENT THAT THE IMAGE PLANE (E.G., FORWARD LOOKING IMAGE PLANE WITH UPWARD TILT) OF A SENSOR (E.G., CAMERA) IS NOT COPLANAR WITH THE GROUND SURFACE. — 2020

THE ADJUSTED VEGETATION INTENSITY ALONG THE ONE OR MORE ROWS OF CROPS (ONE OR MORE VERTICAL LINES) CAN BE THRESHOLDED FOR A MINIMUM VEGETATION INTENSITY, REVEALING PORTIONS OF A CROP ROW WITH LITTLE OR NO PRESENCE OF THE DESIRED VEGETATION. THE ADJUSTED VEGETATION INTENSITY ALONG THE ONE OR MORE ROWS OF CROPS (ONE OR MORE VERTICAL LINES) CAN BE THRESHOLDED FOR A MAXIMUM VEGETATION INTENSITY, REVEALING PORTIONS OF A CROP ROW WITH TOO MUCH OF THE DESIRED VEGETATION. — 2022

DETERMINE A TARGETED PLANT UNIFORMITY (E.G., EMERGENCE SCORE) BASED ON THE SIMPLE MOVING AVERAGE OR A WEIGHTED AVERAGE OF THE TARGETED TYPE OF PLANTS AND THE THRESHOLDING FOR MINIMUM AND MAXIMUM VEGETATION INTENSITY. — 2024

SYSTEMS AND METHODS FOR PROVIDING FIELD VIEWS INCLUDING ENHANCED AGRICULTURAL MAPS HAVING A DATA LAYER AND IMAGE DATA

CROSS-REFERENCE TO RELATED APPLICATIONS

This application is a national phase entry under 35 U.S.C. § 371 of International Patent Application PCT/IB2022/054916, filed May 25, 2022, designating the United States of America and published in English as International Patent Publication WO 2022/259072 A1 on Dec. 15, 2022, which claims priority to U.S. Provisional Application Nos. 63/197,634, filed 7 Jun. 2021 and 63/269,693, filed 21 Mar. 2022, the disclosure of both are incorporated herein by reference in their entirties.

FIELD

Embodiments of the present disclosure relate generally to systems and methods for providing field views including enhanced agricultural maps having a data layer and image data.

BACKGROUND

Planters are used for planting seeds of crops (e.g., corn, soybeans) in a field. Some planters include a display monitor within a cab for displaying a coverage map that shows regions of the field that have been planted. The coverage map of the planter is generated based on planting data collected by the planter. A farmer or grower will interpret the coverage map during the planting to attempt to understand field conditions.

BRIEF DESCRIPTION OF THE DRAWINGS

The present disclosure is illustrated by way of example, and not by way of limitation, in the FIGs. of the accompanying drawings and in which:

FIG. 3 illustrates a flow diagram of one embodiment for a method of customizing field views of agricultural fields with enhanced maps;

FIGS. 20A and 20B illustrate a flow diagram of one embodiment for a computer implemented method of measuring and quantifying crop emergence uniformity within an agricultural field;

BRIEF SUMMARY

Figure 1:
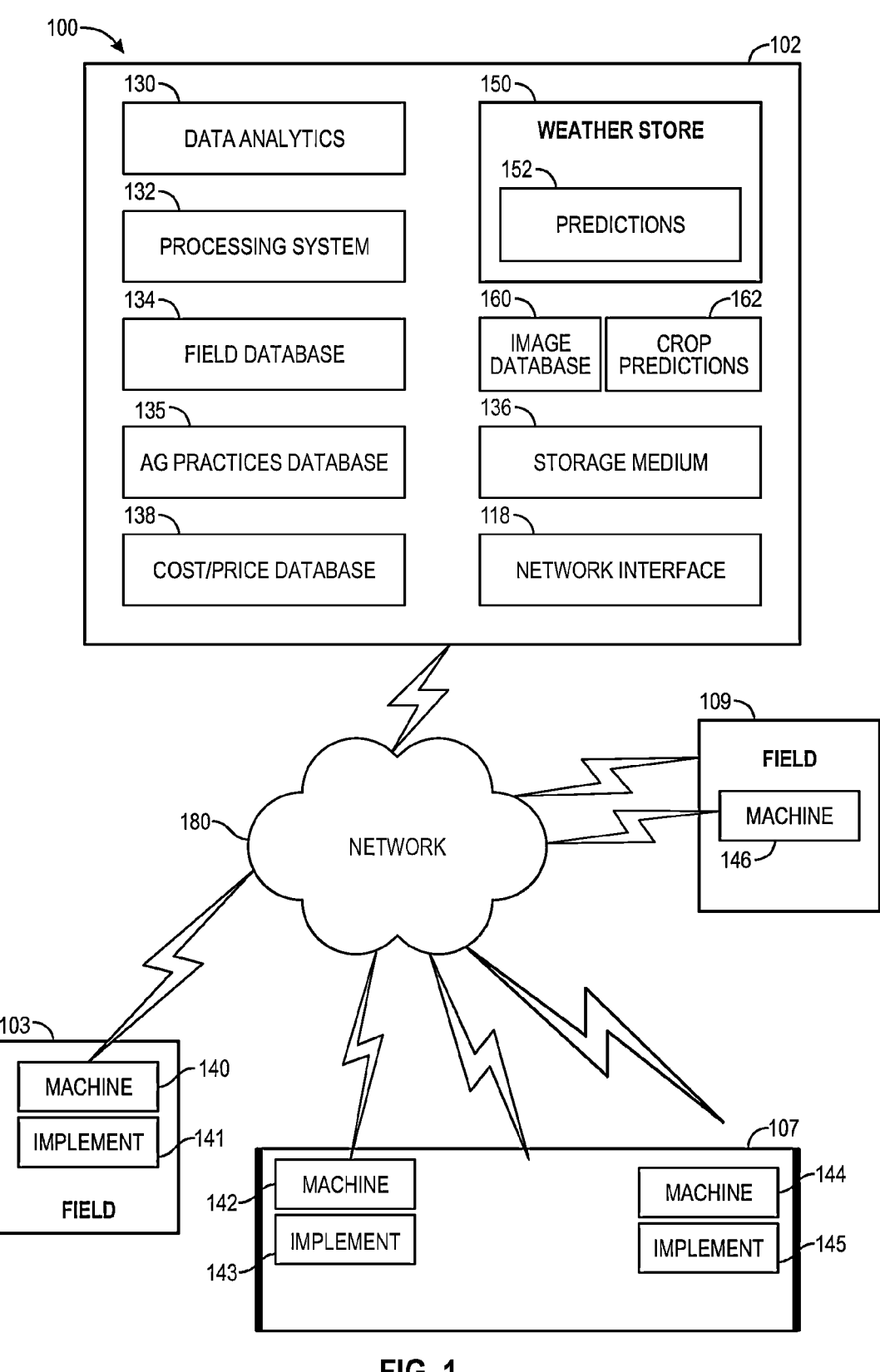
FIG. 1 shows an example of a system for collecting data of agricultural fields and performing analysis of the data of agricultural fields in accordance with one embodiment.

Described herein are systems and methods for providing enhanced field views including enhanced maps based on capturing images of crops during different stages. In an aspect of the disclosure there is provided a computer implemented method for customizing field views of data displays that comprises obtaining a data layer for an agricultural parameter from sensors of an agricultural implement or machine during an application pass for a field and generating a user interface with an enhanced map that includes the data layer for the agricultural parameter and generating selectable icons overlaid at different geographic locations on the enhanced map for the field with the selectable icons representing captured images at the different geographic locations. Each selectable icon represents an image from the field to show crop, weed, or soil conditions.

According to an aspect of the disclosure there is provided the user interface that comprises a split screen view with the enhanced map on a first side of the split screen view and an overview image of the field on a second side of the split screen view.

A further aspect of the disclosure provides the agricultural implement that comprises a planter, sprayer, or irrigation implement having row units with each row unit having a sensor for capturing images to obtain the data layer.

A further aspect of the disclosure further comprises displaying the user interface with the enhanced map on the display device, receiving a user input to select an icon of the enhanced map, and generating an updated user interface with the enhanced map and an image that is associated with the selected icon changing color on the enhanced map.

A further aspect of the disclosure provides the image that is displayed as a pop up window or over an overview image of the field.

A further aspect of the disclosure includes the enhanced map that provides an ability to select icons throughout the field to show actual captured images of crops, weeds, and conditions of soil of the field.

A further aspect of the disclosure includes the selectable icons that are generated and overlaid at different geographic locations on the enhanced map for the field based on a spatial trigger to capture an image during the application pass per unit area within the field, a threshold trigger for when an agricultural parameter exceeds a threshold for the agricultural parameter, a time based trigger for capturing images, or a burst capture of images.

A further aspect of the disclosure includes the selectable icons that are generated and overlaid at different geographic locations on the enhanced map for the field based on a threshold trigger including a weed density exceeding a threshold trigger for weed density or an emergence value exceeding a threshold trigger for emergence data.

A further aspect of the disclosure provides the agricultural parameter that comprises one or more of seed data, commanded planter seed population, actual seed population determined from a seed sensor, a seed population deviation, singulation data, weed map, emergence data, emergence map, emergence environment score based on a combination of temperature and moisture correlated to how long a seed takes to germinate, emergence environment score based on a percentage of seeds planted that will germinate within a selected number of days, time to germination, time to emergence, and seed germination risk.

In an aspect of the disclosure there is provided a computing device that comprises a display device for displaying a user interface having a scale region and a field region for an agricultural parameter and a processor coupled to the display device. The processor is configured to generate a data layer for the agricultural parameter from sensors of an agricultural implement that collects the data during an application pass for a field, to generate the user interface with an enhanced map that includes the data layer for the agricultural parameter, and to generate selectable icons or symbols overlaid at different geographic locations on the enhanced map for the field with the selectable icons representing captured images at the different geographic locations.

A further aspect of the disclosure includes the user interface that further comprises a split screen view with the enhanced map on a first side of the split screen view and an overview image of the field on a second side of the split screen view.

A further aspect of the disclosure includes the agricultural implement that comprises a planter, sprayer, or irrigation implement having row units with each row unit having a sensor for capturing images to obtain the data layer.

A further aspect of the disclosure includes the display device to display the user interface with the enhanced map and to receive a user input to select an icon of the enhanced map, wherein the processor is configured to generate an updated user interface with the enhanced map and an image that is associated with a selected icon or symbol based on the user input with the selected icon or symbol changing color.

A further aspect of the disclosure includes the updated user interface to provide a selectable orientation option to rotate an orientation of the images of the user interface, a selectable expand option to control sizing of a displayed map in a field region, a selectable icon or symbol option to enable or disable showing icons or symbols on the enhanced map, a selectable full map option to switch between a full screen view of map versus a split screen view having both of a map and an overview image, and a selectable statistics option to show statistics for the data layer.

A further aspect of the disclosure includes the display device to receive a user input to modify the scale region and to display a modified scale region and a corresponding modified field region.

In an aspect of the disclosure there is provided a computer implemented method for customizing field views of a field region that comprises obtaining a data layer for an agricultural parameter from sensors of an agricultural implement that collects data during an application pass for a field and generating selectable icons and overlaying the selectable icons at different geographic locations on an enhanced map of the data layer for the field based on a spatial trigger to capture an image during the application pass per unit area or when an agriculture parameter compares in a predetermined manner to a threshold trigger for the agricultural parameter.

A further aspect of the disclosure further comprises comparing the agricultural parameter to the threshold trigger, determining whether the agricultural parameter exceeds the threshold trigger for a location within the field, and generating a selectable icon when the agricultural parameter exceeds the threshold trigger for the location within the field.

A further aspect of the disclosure includes the threshold trigger that comprises a weed threshold that is compared to a weed density.

A further aspect of the disclosure includes the threshold trigger that comprises an emergence threshold that is compared to an emergence value for plant emergence data.

A further aspect of the disclosure further comprises displaying a user interface with the enhanced map that includes the data layer for the agricultural parameter and the selectable icons overlaid at different geographic locations on the enhanced map for the field.

A further aspect of the disclosure includes the agricultural implement that comprises a planter, sprayer, or irrigation implement having row units with each row unit having a sensor for capturing images to obtain the data layer.

In an aspect of the disclosure there is provided a computer implemented method for measuring and quantifying crop emergence uniformity within an agricultural field. The method comprises obtaining one or more images of biomass data for a region of interest within the agricultural field from one or more sensors of an agricultural implement or machine, which can be traversing the field to obtain the biomass data for various crop stages or for an application pass. The computer implemented method partitions a captured image into tiles, provides the tiles to a deep learning model to provide modeled tiles with predicted pixel values (e.g., 1 for targeted vegetation, 0 for weeds or other non-targeted vegetation) and reassembles the modeled tiles on a per tile basis to display the targeted type of vegetation in dimensionality of the original one or more images.

A further aspect of the disclosure includes applying a predetermined mask to select portions of the one or more images that correspond with the targeted type of vegetation pixels.

A further aspect of the disclosure includes accumulating the targeted type of vegetation pixels to create one or more rows of crops (e.g., vertical lines) corresponding to vegetation intensity.

A further aspect of the disclosure includes applying a filter (e.g., one-dimensional filter) with a length corresponding to the spacing in pixels between individual plants of the targeted type of plants along a row of plant intensity (e.g., vertical line of plant intensity) to determine a simple moving average or a weighted average of vegetation intensity for the targeted type of plants.

A further aspect of the disclosure includes applying upper and lower thresholds to the simple moving average or a weighted average of vegetation intensity along the one or more rows of crops (one or more vertical lines) and determining a targeted plant uniformity based on the simple moving average or a weighted average of vegetation intensity of the targeted type of plants and the thresholding for lower (minimum) and upper (maximum) vegetation intensity. The portion of the crop row (or vertical line) meeting both thresholding criteria can represent an emergence score between 0 and 100%.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

DETAILED DESCRIPTION

Described herein are systems and methods for customizing views of visualized data (such as from agricultural fields for weed maps during different crop stages, crop emergence, etc.) based on sensors of agricultural implements or machines.

In one embodiment, at least one of an implement, a machine, an agricultural vehicle, an aerial device, a drone, a self-propelled device (e.g., robot, off-road vehicle, ATV, UTV), an electronic device, or a mobile device having sensors (e.g., image capturing devices) collects agricultural data before, during, or after an application pass. The agricultural data may include a data layer that is mapped as a field view on a monitor or display device and image data that overlays the data layer to enhance a user experience in viewing and understanding the agricultural data. On the map of the field, icons (e.g., camera icon, image icon) appear where the implement, a machine, an agricultural vehicle, or an aerial device with the sensors (e.g., a camera or set of cameras) captured images of regions of the field. In one example, the captured images are used for weed identification or for crop emergence. When an operator selects (e.g., user input, touch input) the icon from the monitor or display device, the image from that geographic location in the field is displayed either as a pop up window over the map or in a side by side view with the map. The icon can change color to indicate which icon was selected. The image data can be overlaid, associated, merged, or combined with the data layer for a field view.

The user can customize (e.g., change, expand, pan) a scale of a parameter for a sub region (e.g., scale region) of a user interface and a corresponding field view of an agricultural field of the user interface automatically changes in response to the customized change in order to have a customized view of the parameter being displayed in the field view. The user does not need to manually adjust the field view because this adjustment occurs automatically upon adjusting the scale region. As used herein, expand can refer to both a positive expansion and a negative expansion (contraction).

In the following description, numerous details are set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Referring to the drawings, wherein like reference numerals designate identical or corresponding parts throughout the several views, FIG. 1 shows an example of a system for collecting and analyzing agricultural data from agricultural fields in order to display customized agricultural data in accordance with one embodiment. Machines and implements of the system 100 perform agricultural operations (e.g., planting seed in a field, applying fluid applications to plants) of agricultural fields.

For example, the system 100 may be implemented as a cloud based system with servers, data processing devices, computers, etc. Aspects, features, and functionality of the system 100 can be implemented in servers, wireless nodes, planters, planter monitors, sprayers, sidedress bars, combines, laptops, tablets, computer terminals, client devices, user devices, handheld computers, personal digital assistants, cellular telephones, cameras, smart phones, mobile phones, computing devices, or a combination of any of these or other data processing devices.

The system 100 can include a network computer or an embedded processing device within another device (e.g., display device), an implement, or within a machine (e.g., tractor cab, agricultural vehicle), or other types of data processing systems having fewer components or perhaps more components than that shown in FIG. 1. The system 100 (e.g., cloud based system) and agricultural operations can control and monitor planting and fluid applications using an implement or machine. The system 100 includes machines 140, 142, 144, 146 and implements 141, 143, 145 coupled to a respective machine 140, 142, and 144. The implements (e.g., planter, cultivator, plough, sprayer, spreader, irrigation implement) can include flow devices for controlling and monitoring applications (e.g., seeding, spraying, fertilization) of crops and soil within associated fields (e.g., fields 103, 107, 109). The system 100 includes an agricultural analysis system 102 that can include a weather store 150 with current and historical weather data, weather predictions module 152 with weather predictions for different regions, and at least one processing system 132 for executing instructions for controlling and monitoring different operations (e.g., fluid applications). The storage medium 136 may store instructions, software, software programs, etc. for execution by the processing system and for performing operations of the agricultural analysis system 102. In one example, storage medium 136 may contain a fluid application prescription (e.g., fluid application prescription that relates georeferenced positions in the field to application rates). The implement 141 (or any of the implements) may include an implement with a pump, flow sensors and/or flow controllers that may be specifically the elements that are in communication with the network 180 for sending control signals or receiving as-applied data. The network 180 (e.g., any wireless network, any cellular network (e.g., 4G, 5G), Internet, wide area network, WiMax, satellite, IP network, etc.) allows the system 102, wireless nodes, machines, and implements of FIG. 1 to communicate between each other when the system 102, wireless nodes, machines (e.g., 140, 142, 144, 146), or implements (e.g., 141, 143, 145) are connected to the network 180. Examples of agricultural monitors are described in PCT Publication Nos. WO2008/086318, WO2012/129442, WO2013/049198, WO2014/026183, and WO2014/018717. An example of an agricultural monitor is the 20|20® monitor from Precision Planting, LLC. In one example, a monitor preferably includes a graphical user interface ("GUI"), a memory, a central processing unit ("CPU"), and a bus node. The bus node preferably comprises a controller area network ("CAN") node including a CAN transceiver, a controller, and a processor. The monitor is preferably in electrical communication with a speed sensor (e.g., a radar speed sensor mounted to a tractor) and a global positioning receiver ("GPS") receiver mounted to the tractor (or in some embodiments to a toolbar of an implement).

As an agricultural implement traverses a field, a monitor A of a first machine (e.g., 140, 142, 144, 146) collects as applied data at various points in the field. The first machine may be coupled to the agricultural implement and causing the agricultural implement to traverse the field. The as applied data can be seeding information, such as percent singulation, skips, multiples, downforce, applied fluids, depth measurements, agronomic measurements, and anything else that is collected. As, the as applied data is collected and stored in a monitor data file of the monitor A, field boundary and prescriptions are embedded into the data file.

File transfer from monitor A of the first machine to monitor B of a second machine can be accomplished through any data exchange, such as saving the file to a USB stick, via cloud exchange, or by direct vehicle to vehicle communications network. In one example, the first machine and the second machine are communicatively coupled to the network 180 and one or more files are transferred from the monitor A to the monitor B via the network 180.

Data recorded by monitor A at one location can be used to influence control of monitor B in other locations or the same location during a different application pass. For instance, when seeds are dropped, spatial data indicates that seeds have been applied (or covered) in that area. That coverage information can then be used by monitor B as the equipment traverses the field for a different application to instruct the control modules when to turn on or off. This information is used to automatically control the equipment. Many data channels exist that are mapped spatially to be viewed by the operator. In many cases, this data is not used by the monitor to automatically control itself while the equipment traverses the field. However, the operator is influenced by this information, and the operator may choose to operate the equipment in a different way based on data from previous field passes and his present location in the field. Sharing data between equipment can either influence the automatic control of the equipment, or it influences the operator, who then controls the equipment differently.

Figure 2:
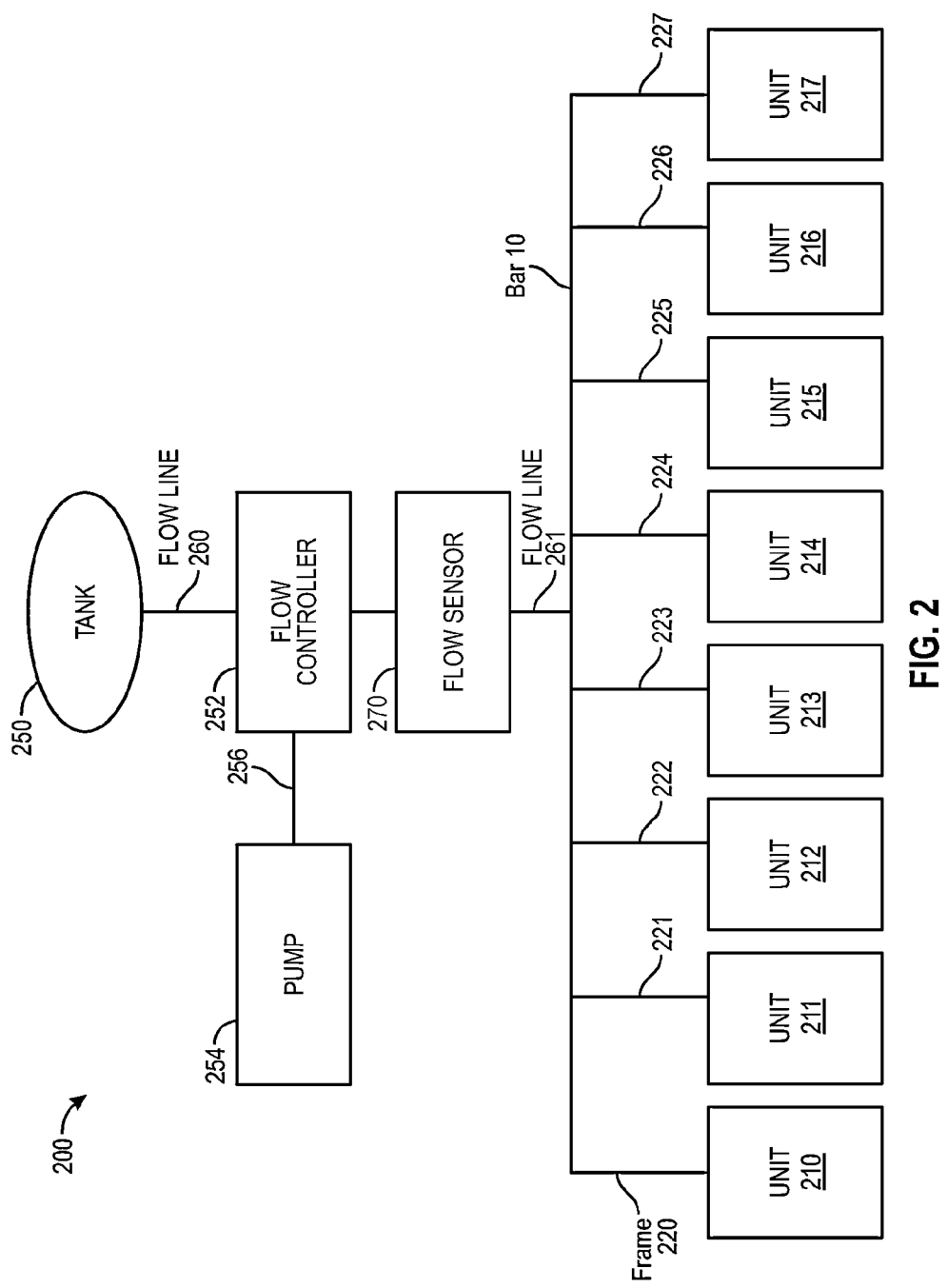
FIG. 2 illustrates an architecture of an implement 200 for delivering applications (e.g., fluid applications, fluid mixture applications) to agricultural fields in accordance with one embodiment.

FIG. 2 illustrates an architecture of an implement 200 for delivering applications (e.g., fluid applications, fluid mixture applications) to agricultural fields in accordance with one embodiment. The implement 200 includes at least one storage tank 250, flow lines 260 and 261, a flow controller 252 (e.g., valve), and at least one variable-rate pump 254 (e.g., electric, centrifugal, piston, etc.) for pumping and controlling application rate of a fluid (e.g., fluid application, semifluid mixture) from the at least one storage tank to different application units 210-217, respectively of the implement. At least one flow sensor 270 can be utilized on the implement 200 either row-by-row or upstream of where the fluid branches out to the application units as illustrated in FIG. 2. The flow controller 252 can be row-by-row as opposed to implement-wide as shown in FIG. 2.

The applications units are mechanically coupled to the frames 220-227 which are mechanically coupled to a bar 10. Each application unit 210-217 can include flow sensors and components having a placement mechanism (e.g., planting contacting members, feelers, guidance members) for obtaining a proper orientation and/or positioning of a fluid outlet with respect to a plant in an agricultural field.

FIG. 3 illustrates a flow diagram of one embodiment for a method 300 of providing enhanced field views of data displays based on vision scouting of crops, weeds, and field conditions. The method 300 is performed by processing logic that may comprise hardware (circuitry, dedicated logic, etc.), software (such as is run on a general purpose computer system or a dedicated machine or a device), or a combination of both. In one embodiment, the method 300 is performed by processing logic of a processing system of a system 102, machine, apparatus, implement, agricultural vehicle, aerial device, monitor, display device, user device, self-guided device, or self-propelled device (e.g., robot, ATV, UTV, etc.). The processing system executes instructions of a software application or program with processing logic. The software application or program can be initiated by the processing system. In one example, a monitor or display device receives user input and provides a customized display for operations of the method 300.

At operation 302, a software application is initiated on the processing system and displayed on a monitor or display device as a user interface. The processing system may be integrated with or coupled to a machine that performs an application pass (e.g., planting, tillage, fertilization, spraying, etc.). Alternatively, the processing system may be integrated with an apparatus (e.g., drone, image capture device) associated with the machine that captures images before, during, or after the application pass. In one example, the user interface includes a map of a data layer (e.g., seed data, commanded planter seed population, actual seed population determined from a seed sensor, a seed population deviation, singulation data, weed map, emergence data, emergence map, emergence environment score based on a combination of temperature and moisture correlated to how long a seed takes to germinate, emergence environment score based on a percentage of seeds planted that will germinate within a selected number of days, time to germination, time to emergence, seed germination risk) for a field of interest and an overview image of the field of interest. Seed germination risk can be germination/emergence (no germination/emergence, on time germination/emergence, or late germination/emergence) or factors other than time, such as, deformities, damaged seed, reduced vigor, or disease. Seed germination risk can be high, medium, or low, or it can be on-time emergence, late emergence, or no emergence.

The data layer can be generated from data collected by sensors on an implement, a machine pulling the implement during a current application pass, an aerial device, a user device, a self-guided device, a self-propelled device, etc., or the data layer can be generated from a previous application pass through the field. The sensors may be in-situ sensors positioned on each row unit of an implement, spaced across several row units, or positioned on a machine.

At operation 304, the software application receives user input, and generates an updated user interface that is displayed with the monitor or display device. The updated user interface is generated based on the user input and may include an enhanced map of the data layer and optionally the overview image of the field. The enhanced map includes the data layer and also icons or symbols to represent captured images at different georeferenced positions across the field. In one example, at operation 306, the icons (e.g., camera icons, image icons) or symbols can be positioned spatially at a certain approximate distance from each other within the field based on a user defined spatial or grid based input.

In another example, at operation 306, the icons or symbols can be positioned on a field view based on a threshold trigger that is compared to an agricultural parameter (e.g., agricultural parameter is less than, equal to, or exceeds a threshold value for the agricultural parameter; weed pressure or density is less than, equal to, or exceeds a threshold trigger; emergence value is less than, equal to, or exceeds a threshold trigger, etc.) for the data layer at different locations within a field.

In another example, at operation 306, the icons or symbols can be positioned based on a user defined time period or predetermined time period (e.g., capture 1 image every 10 seconds, capture 1 image every 1 minute). In another example, at operation 306, the icons or symbols can be positioned based on a burst capture of images at certain locations within the field.

At operation 308, the software application receives a user input (e.g., touch user input) to select an icon or symbol of the enhanced map of the data layer.

At operation 310, the software application generates an updated user interface based on the user input with the selected icon changing color. At operation 312, the monitor or display device displays the updated user interface including the enhanced map having the selected icon changing color and an image of the selected icon being displayed as a pop up window or over the overview image of the field. The user experience and understanding of a color map of the data layer is improved by being able to select icons or symbols throughout a field to show actual captured images of crops, weeds, and conditions of the soil of the field in combination with the map of the data layer.

At operation 314, the software application (e.g., scale region of the user interface) may optionally receive additional user input (e.g., expand (positive expansion, negative expansion or contraction), panning operation) to modify a scale of the scale region for the agricultural parameter. For example, a scale of the scale region for an agricultural parameter can be modified from being between 0 to 100 percent to being between 20 to 50% based on the user input. The displayed field region of the enhanced map is modified in a corresponding manner as the modified scale region and will only show values between 20 to 50% for this example.

At operation 316, the software application generates a modified scale region and also a modified field region based on the additional user input. U.S. Pat. No. 10,860,189, which is incorporated by reference herein, describes how to generate a modified scale region and also a modified field region based on the user input. The monitor or display device displays the modified scale region and the corresponding modified field region. The operations 312, 314, and 316 can be repeated if additional user input for modifying the scale region are received by the software application.

In one example, the user input can include first expand operation (e.g., pinch motion with 2 user input points contacting the scale region and moving towards each other to expand in (or contract), e.g., 1 finger and 1 thumb or 2 fingers), a second expand operation (e.g., expand with 2 user input points contacting the scale region moving away from each other to expand out), a first panning operation (e.g., panning with 1 user input point contacting the scale region and moving upwards (or downwards), e.g. 1 finger or 1 thumb), or a second panning operation (e.g., panning with 1 user input point contacting scale region and moving downwards (or upwards), e.g. 1 finger or 1 thumb).

In some embodiments, the operations of the method(s) disclosed herein can be altered, modified, combined, or deleted. The methods in embodiments of the present disclosure may be performed with a device, an apparatus, or data processing system as described herein. The device, apparatus, or data processing system may be a conventional, general-purpose computer system or special purpose computers, which are designed or programmed to perform only one function, may also be used.

Figure 4:
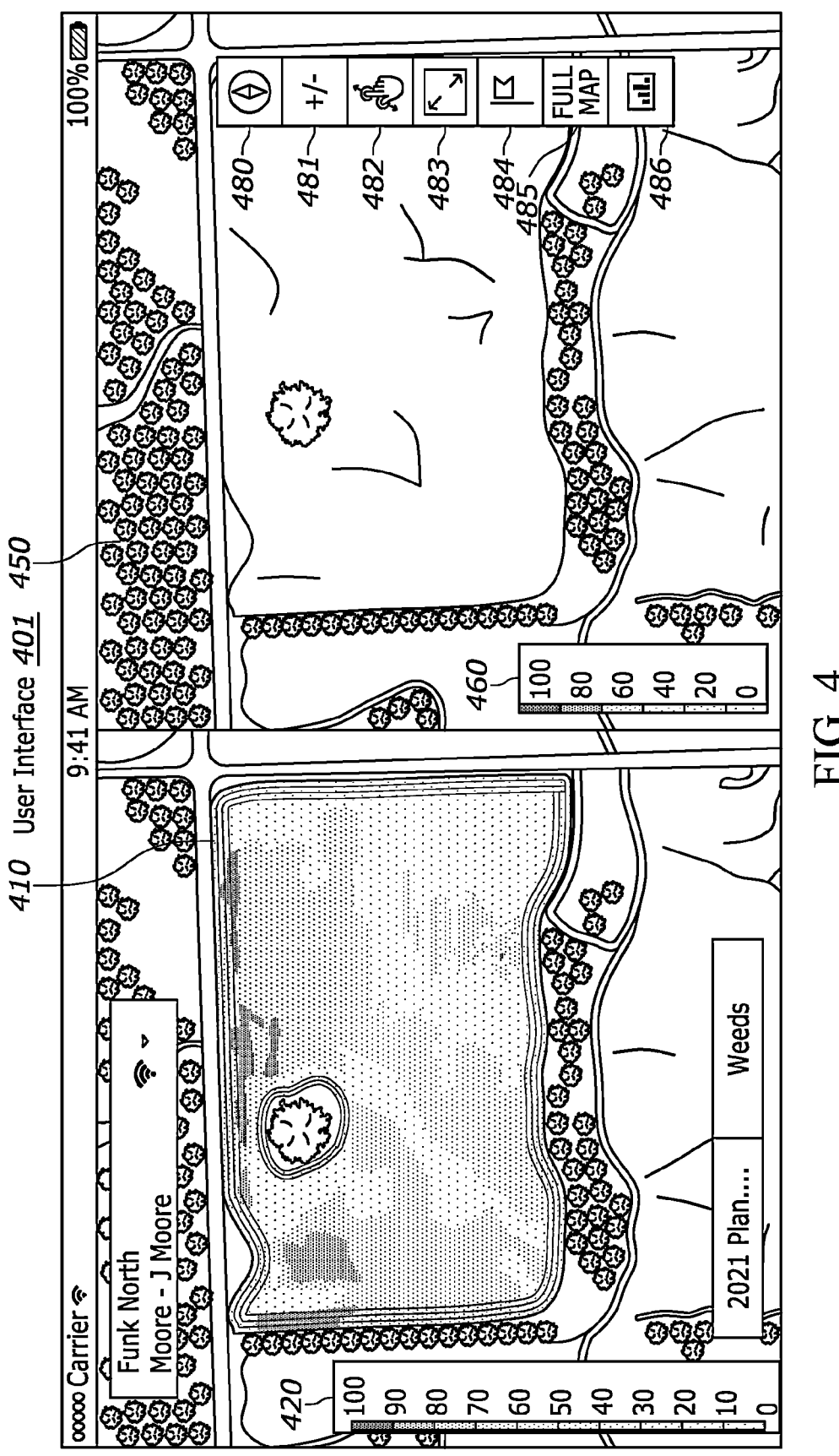
FIG. 4 illustrates a monitor or display device having a user interface 401 with a split screen view that includes a map of a data layer and an overview image in accordance with one embodiment.

FIG. 4 illustrates a monitor or display device having a user interface 401 with a split screen view that includes a map of a data layer and an overview image in accordance with one embodiment. Processing logic executes instructions of an initiated software application (e.g., field application) of a processing system to generate the user interface 401 that is displayed by the monitor or display device.

The software application can provide different display regions that are selectable by a user. The map 410 (e.g., weed map) shows a weed data layer across a field and a scale region 420 shows weed coverage or weed density on a scale from 100% to 0%. The overview image 450 shows an overview of the field and has a scale region 460.

In one example, the user interface 401 includes a selectable orientation option 480 to rotate an orientation of the images of the user interface with respect to a true North direction, a selectable plus/minus zoom option 481, a selectable pinch to zoom option 482, a selectable expand option 483 to control sizing of a displayed map in a field region, a selectable icon option 484 to enable or disable showing image icons or symbols on the map 410, a selectable full map option 485 to switch between different viewing options (e.g., a full screen view of map 410, a split screen view having both map 410 and overview image 450, a split screen view having an image with no map, etc.) and a selectable statistics option 486 to show statistics (e.g., bar charts, numerical data, histograms, number of acres of a field having weed pressure or density that exceeds a threshold) for the data layer or the weed data of the weed pressure or weed density.

Figure 5:
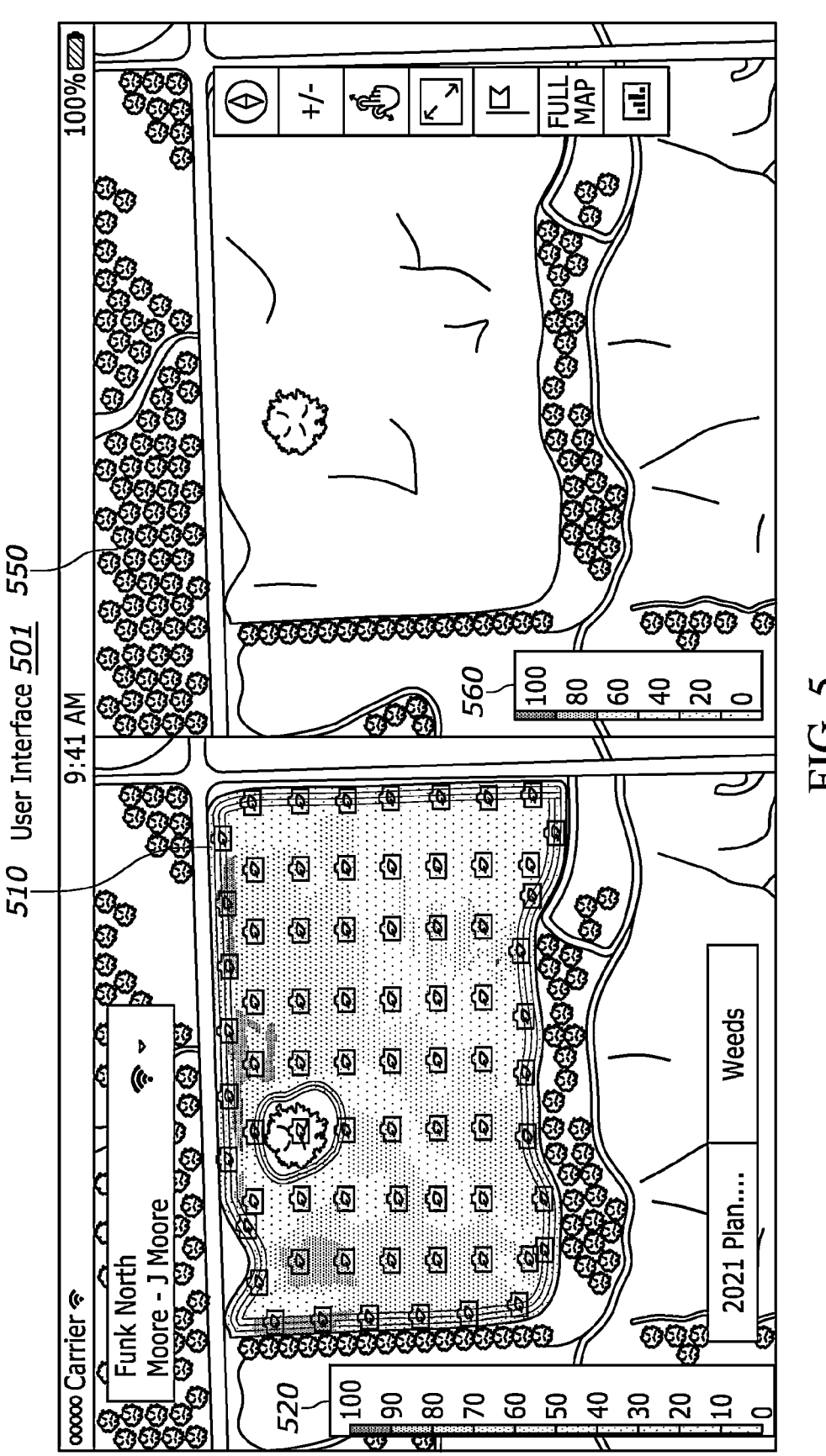
FIG. 5 illustrates a monitor or display device having a user interface 501 with a split screen view that includes an enhanced map of a data layer with icons and an overview image in accordance with one embodiment.

FIG. 5 illustrates a monitor or display device having a user interface 501 with a split screen view that includes an enhanced map of a data layer with icons and an overview image in accordance with one embodiment. Processing logic executes instructions of an initiated software application (e.g., field application) of a processing system to generate the user interface 501 that is displayed by the monitor or display device.

The software application can provide different display regions that are selectable by a user. The enhanced map 510 (e.g., enhanced weed map) shows a weed data layer across a field with selectable icons or symbols for images and a scale region 520 shows weed pressure, coverage, or weed density on a scale from 100% to 0%. The overview image 550 shows an overview of the field and has a scale region 560. The images that are represented with icons or symbols are captured based on a spatial triggering (e.g., user provides an input prior to or during an application pass to capture an image during the application pass every acre, every 2 acres, every 5 acres, etc.) or grid based triggering as a machine pulls an implement through a field for an application pass. The icons or symbols and associated captured images are located approximately equidistant from each other as the implement traverses through the field for an application pass. The data layer of the map can also be generated based on capturing images from sensors of an implement, machine, or aerial device.

In one example, a grower provides an input prior to or during a spraying operation for a spatial or grid based triggering of image capturing devices or sensors during the spraying operation. The image capturing devices or sensors capture at least one image for every location that is triggered spatially or based on a grid as defined by the grower.

Figure 6:
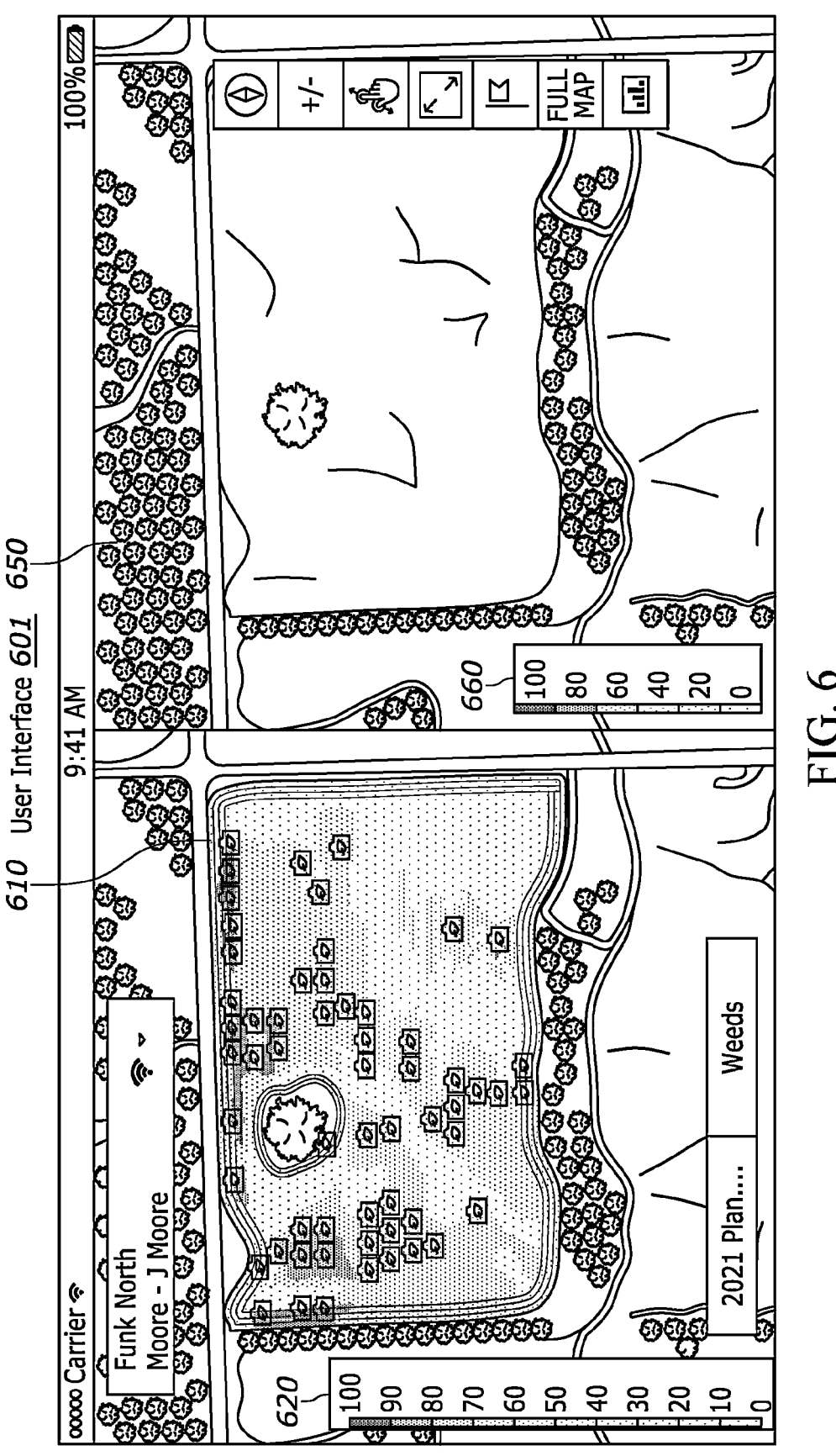
FIG. 6 illustrates a monitor or display device having a user interface 601 with a split screen view that includes an enhanced map of a data layer with icons and an overview image in accordance with another embodiment.

FIG. 6 illustrates a monitor or display device having a user interface 601 with a split screen view that includes an enhanced map of a data layer with icons or symbols and an overview image in accordance with another embodiment. Processing logic executes instructions of an initiated software application (e.g., field application) of a processing system to generate the user interface 601 that is displayed by the monitor or display device.

The software application can provide different display regions that are selectable by a user. The enhanced map 610 (e.g., enhanced weed map) shows a weed data layer across a field with selectable icons or symbols for images and a scale region 620 shows weed coverage, weed pressure, or weed density on a scale from 100% to 0%. The overview image 650 shows an overview of the field and has a scale region 660. The images that are represented with icons or symbols are captured based on a threshold triggering (e.g., agricultural parameter exceeds a threshold value for the agricultural parameter, weed density exceeds a weed threshold trigger (e.g., 80%) then capture an image, emergence value exceeds an emergence threshold trigger then capture an image, etc.) as a machine pulls an implement through a field for an application pass. The icons or symbols and associated captured images are located at a geographical location whenever the agricultural parameter threshold is triggered as the implement traverses through the field.

Figure 7:
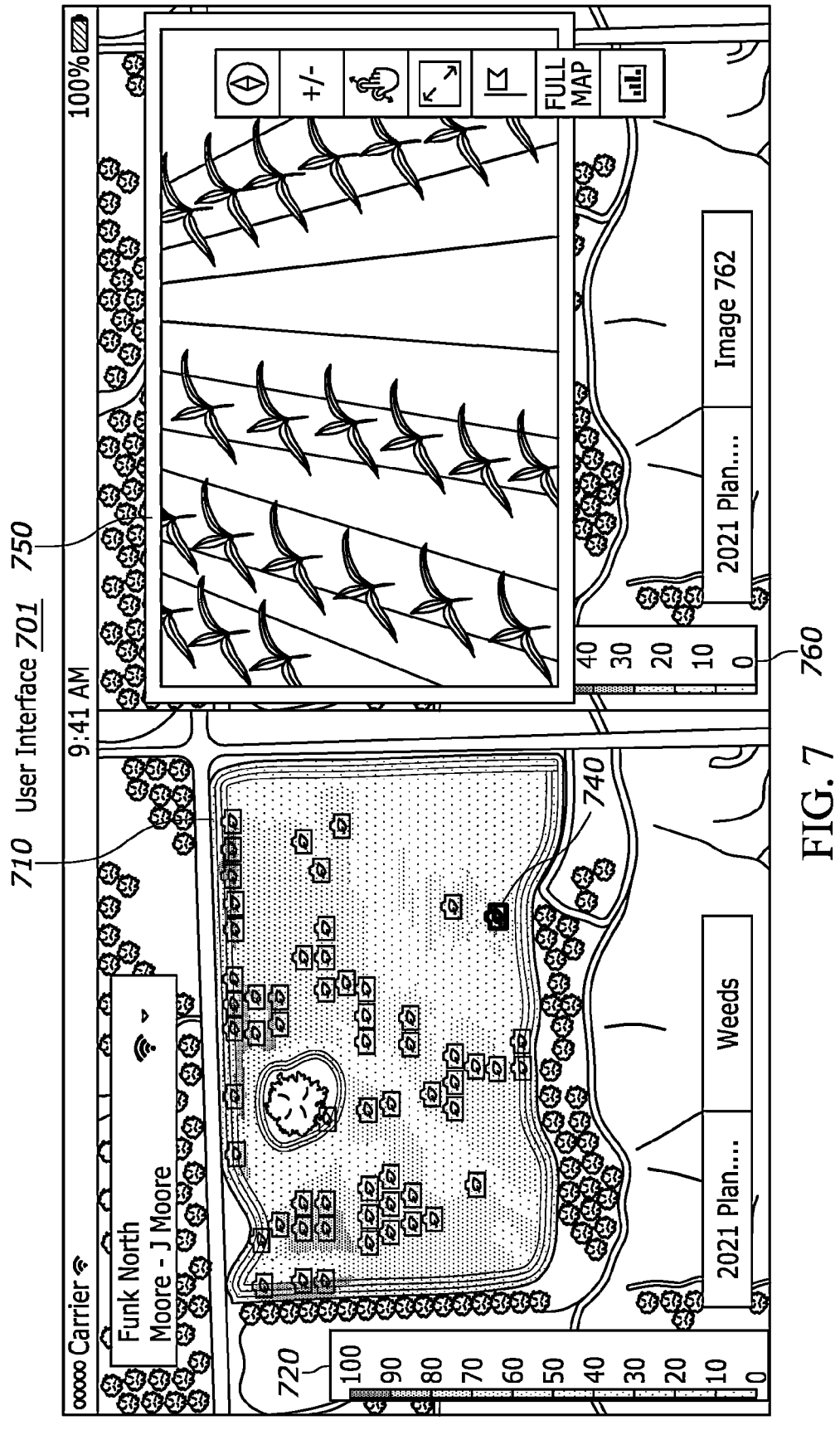
FIG. 7 illustrates a user interface 701 with map 710 and associated scale region 720, and an image 750 for the selected icon 740.

Upon selection of an icon or symbol from the user interface 601 of FIG. 6, the software application displays a user interface 701 with map 710 and associated scale region 720, an image 750 for the selected icon or symbol 740 of FIG. 7 and a scale region 760. The image 750 is an actual field image of crops, weeds, and soil conditions for the selected location from the map 610. In one example, navigation can occur from full screen to split screen view and then an image option 762 can have a drop down sub-menu to select a different data layer or agricultural parameter for display. The image option 762 displays an image 750 that was selected by selecting icon or symbol 740.

Figure 8:
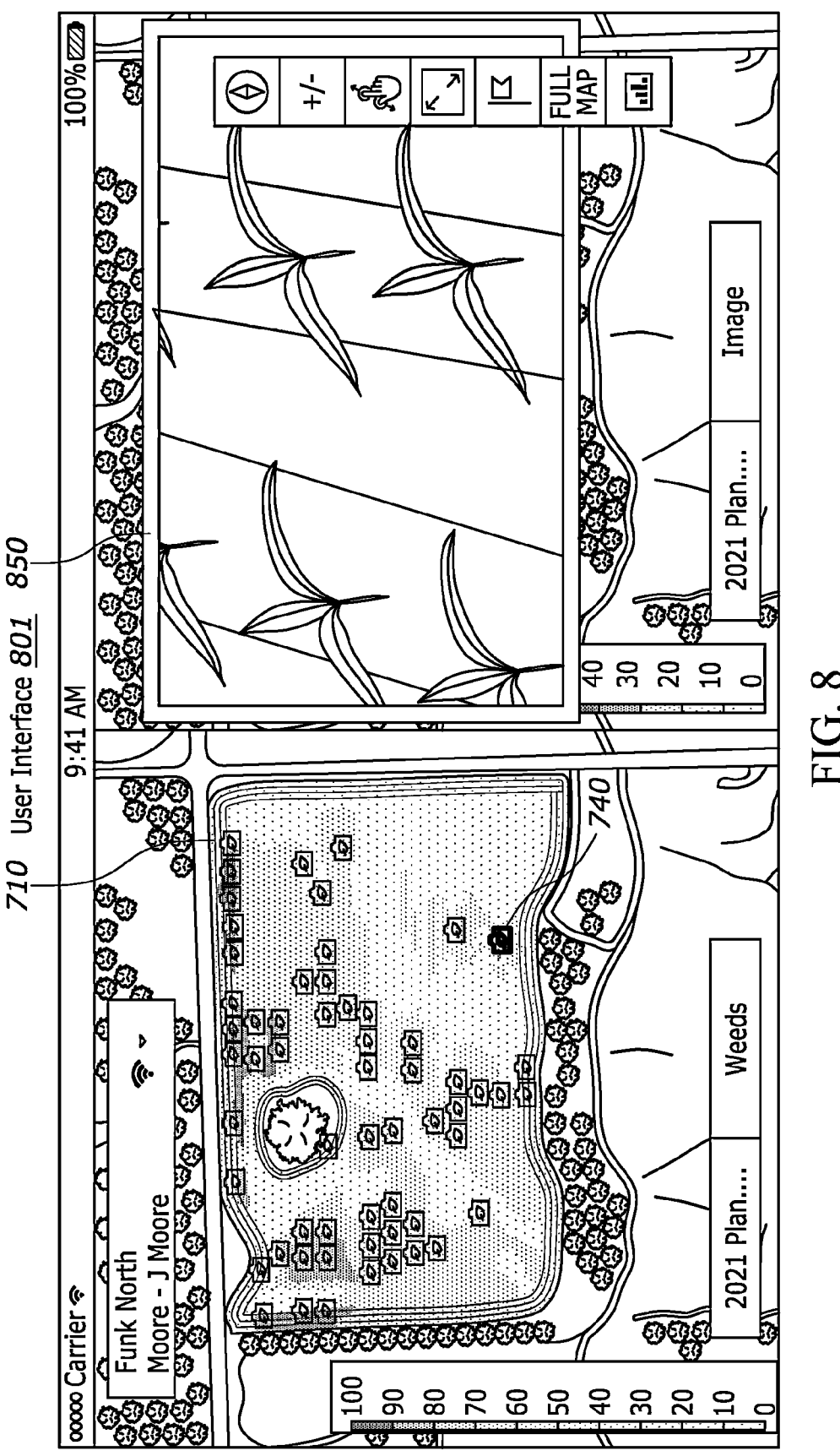
FIG. 8 displays a user interface 801 of FIG. 8 with map 710 and zoomed image 850 to show more details of the crops, weeds, and soil conditions at the geographical location for the selected icon 740.

Upon a pinch zoom input to the image 750, the software application displays a user interface 801 of FIG. 8 with map 710 and zoomed image 850 to show more details of the crops, weeds, and soil conditions at the geographical location for the selected icon 740.

Figure 9:
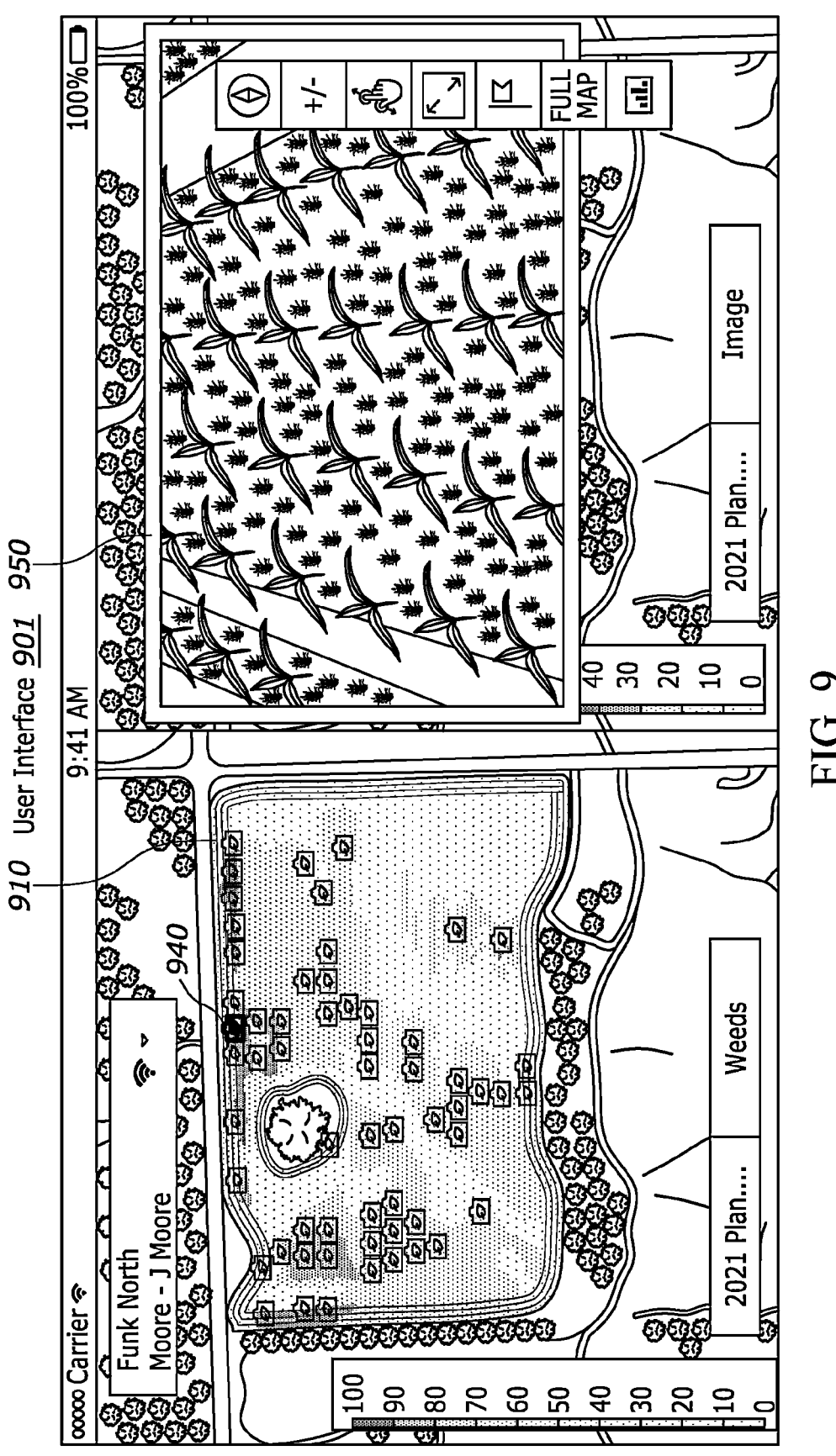
FIG. 9 illustrates the user interface 901 having an image 950 for the selected icon 940.

Upon selection of a different icon 940 from the user interface 901 of FIG. 9, the software application displays an image 950 for the selected icon 940. The image 950 is an actual field image of crops, weeds, and soil conditions for the selected location from the map 910. The weed coverage, pressure, or density exceeds a threshold and this triggers capturing the image 950 in real time from an implement or machine during an application pass or from a previous application pass.

Figure 10:
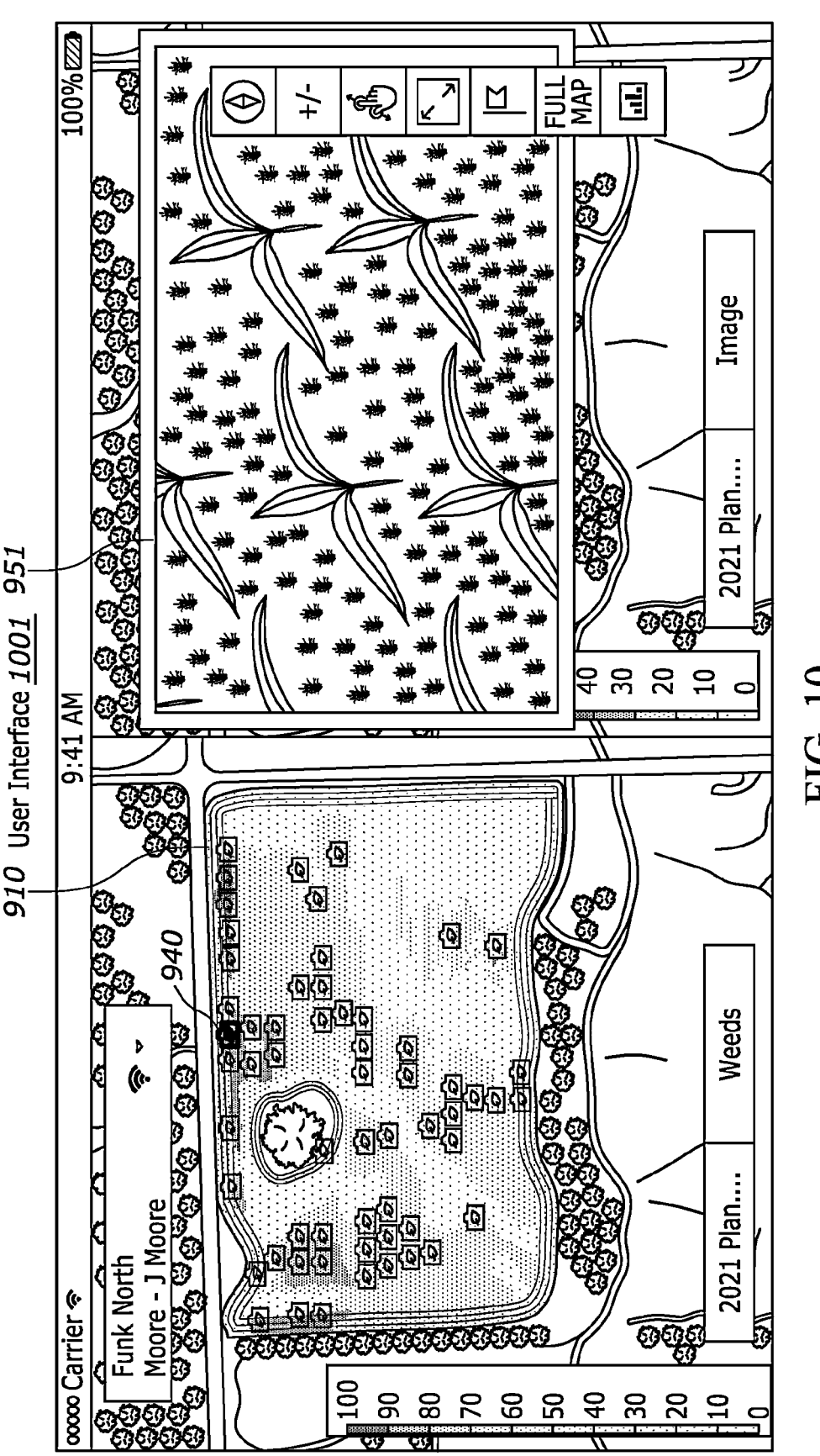
FIG. 10 illustrates a zoomed image 951 to show more details of the crops, weeds, and soil conditions at the geographical location for the selected icon 940.

Upon a pinch zoom input to the image 950, the software application displays a zoomed image 951 of FIG. 10 to show more details of the crops, weeds, and soil conditions at the geographical location for the selected icon 940.

Figure 11:
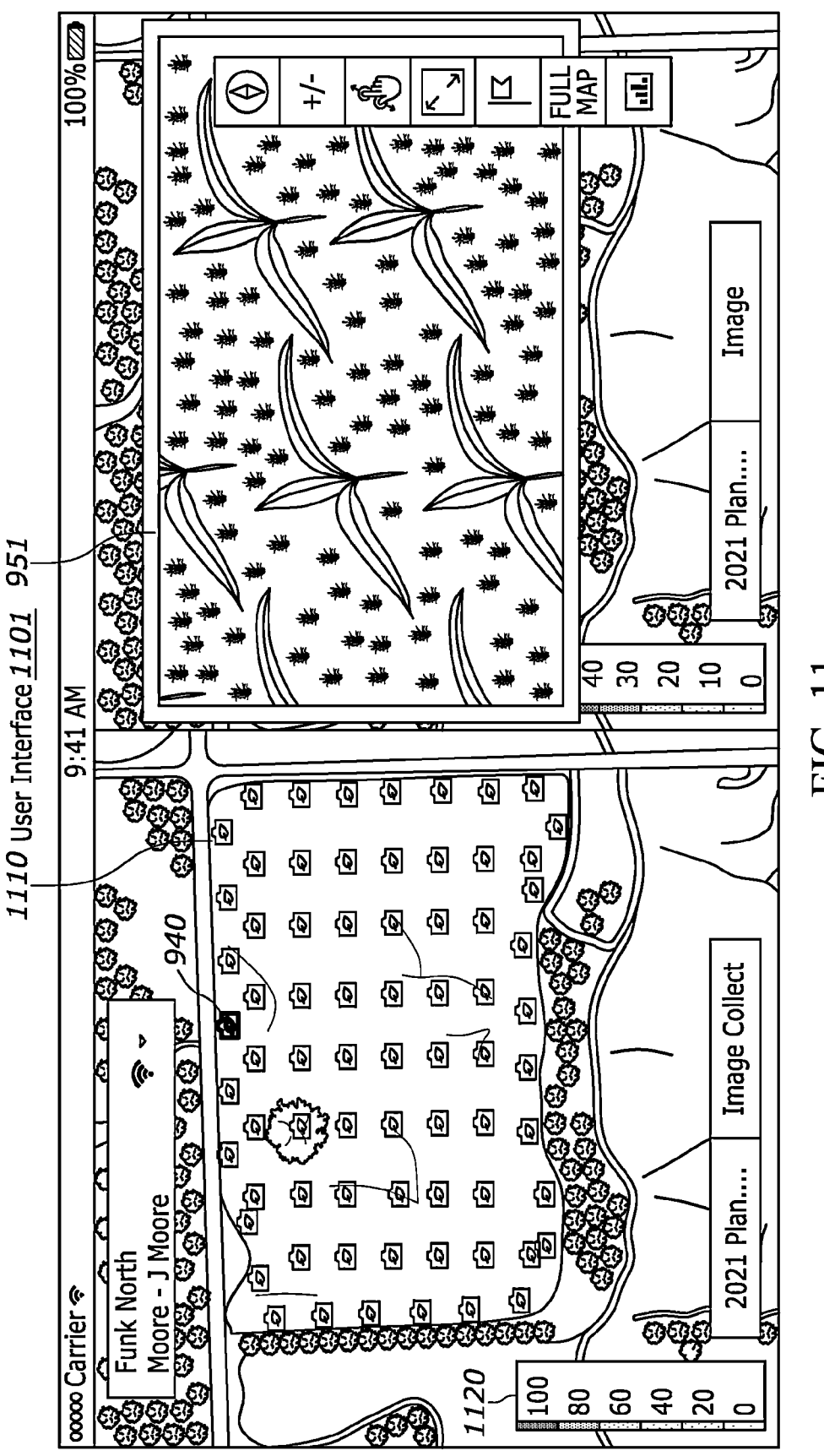
FIG. 11 illustrates a monitor or display device having a user interface 1101 with a split screen view that includes icons overlaid on an overview image 1110 of a field and also the image 951 for a selected icon 940 in accordance with another embodiment.

FIG. 11 illustrates a monitor or display device having a user interface 1101 with a split screen view that includes icons or symbols overlaid on an overview image 1110 of a field and also the image 951 for a selected icon 940 in accordance with another embodiment. Processing logic executes instructions of an initiated software application (e.g., field application) of a processing system to generate the user interface 1101 that is displayed by the monitor or display device.

The software application can provide different display regions that are selectable by a user. The selectable icons or symbols represent captured images and a scale region 1120 shows weed pressure, coverage or weed density on a scale from 100% to 0%. Selection of the icon 940 causes an image 951 to be displayed. The icons and associated captured images are located at geographical locations whenever the icons are spatially triggered as the implement traverses through the field.

Figure 12:
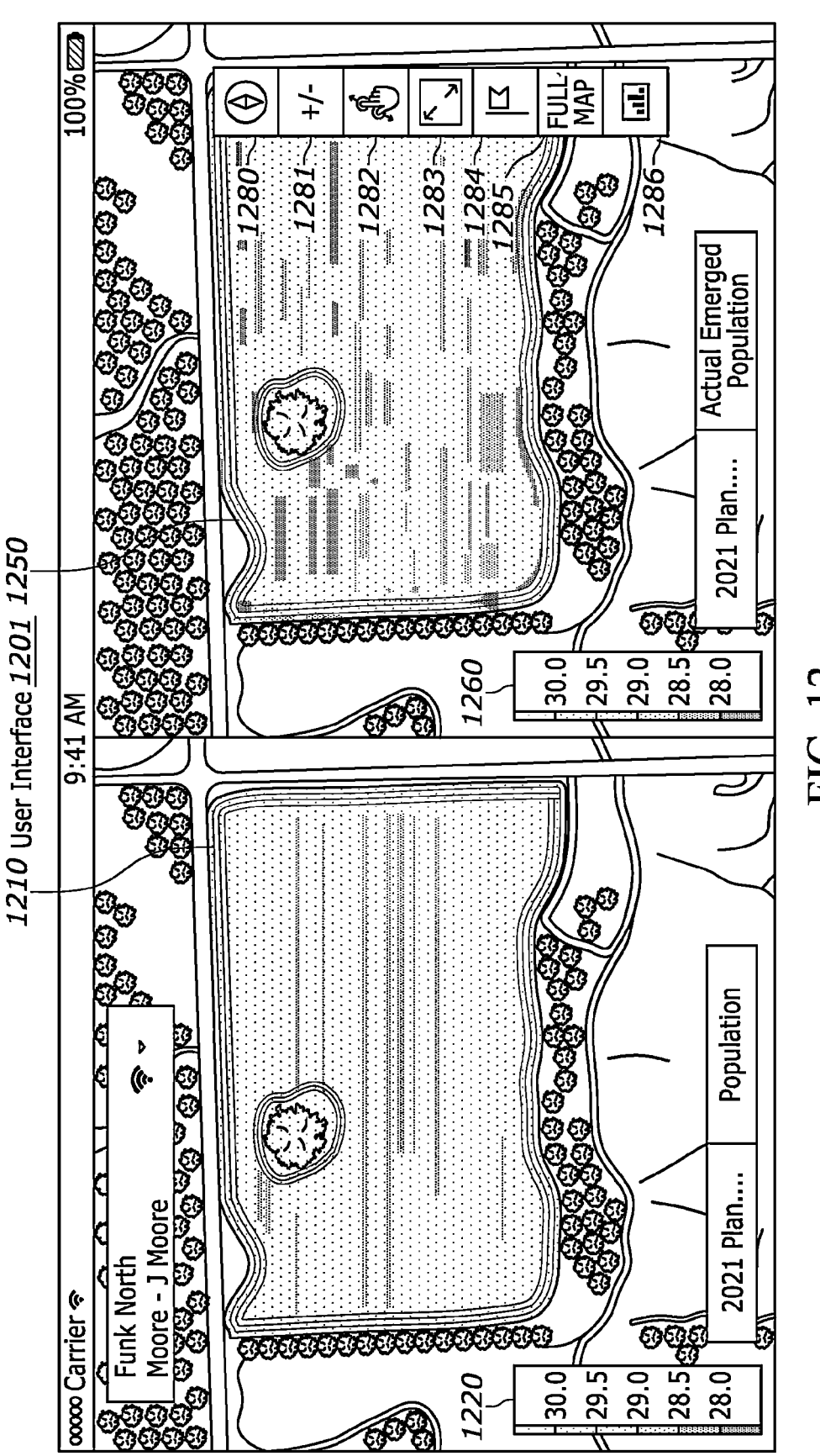
FIG. 12 illustrates a monitor or display device having a user interface 1201 with a split screen view that includes maps of different data layers in accordance with one embodiment.

FIG. 12 illustrates a monitor or display device having a user interface 1201 with a split screen view that includes maps of different data layers in accordance with one embodiment. Processing logic executes instructions of an initiated software application (e.g., field application) of a processing system to generate the user interface 1201 that is displayed by the monitor or display device.

The software application can provide different display regions that are selectable by a user. The map 1210 (e.g., commanded planting population map from a planter, planted population map based on data from a seed sensor) shows a planted population data layer across a field and a scale region 1220 shows seeds per acre in units of 1,000 (e.g., scale region 1220 shows 28,000 to 30,000 seeds per acre). The map 1250 (e.g., actual emerged population map based on data from a sensor after plants emerge from the soil) shows an emerged population data layer across a field and a scale region 1260 shows plants per acre in units of 1,000 (e.g., scale region 1260 shows 28,000 to 30,000 plants per acre).

In one example, the user interface 1201 includes an orientation option 1280 to rotate an orientation of the images of the user interface with respect to a true North direction, a plus/minus zoom option 1281, a pinch to zoom option 1282, an expand option 1283 to control sizing of a displayed map in a field region, an icon option 1284 to enable or disable showing icons on the map 1210, a full map option 1285 to switch between different viewing options (e.g., a full screen view of map 1210, a split screen view having both map 1210 and map 1250, a split screen view having an image with no map, etc.) and a statistics option 1286 to show statistics (e.g., bar charts, numerical data, histograms, number of acres of a field having emerged plant population below a threshold) for the data layer or the actual emerged population data.

Figure 13:
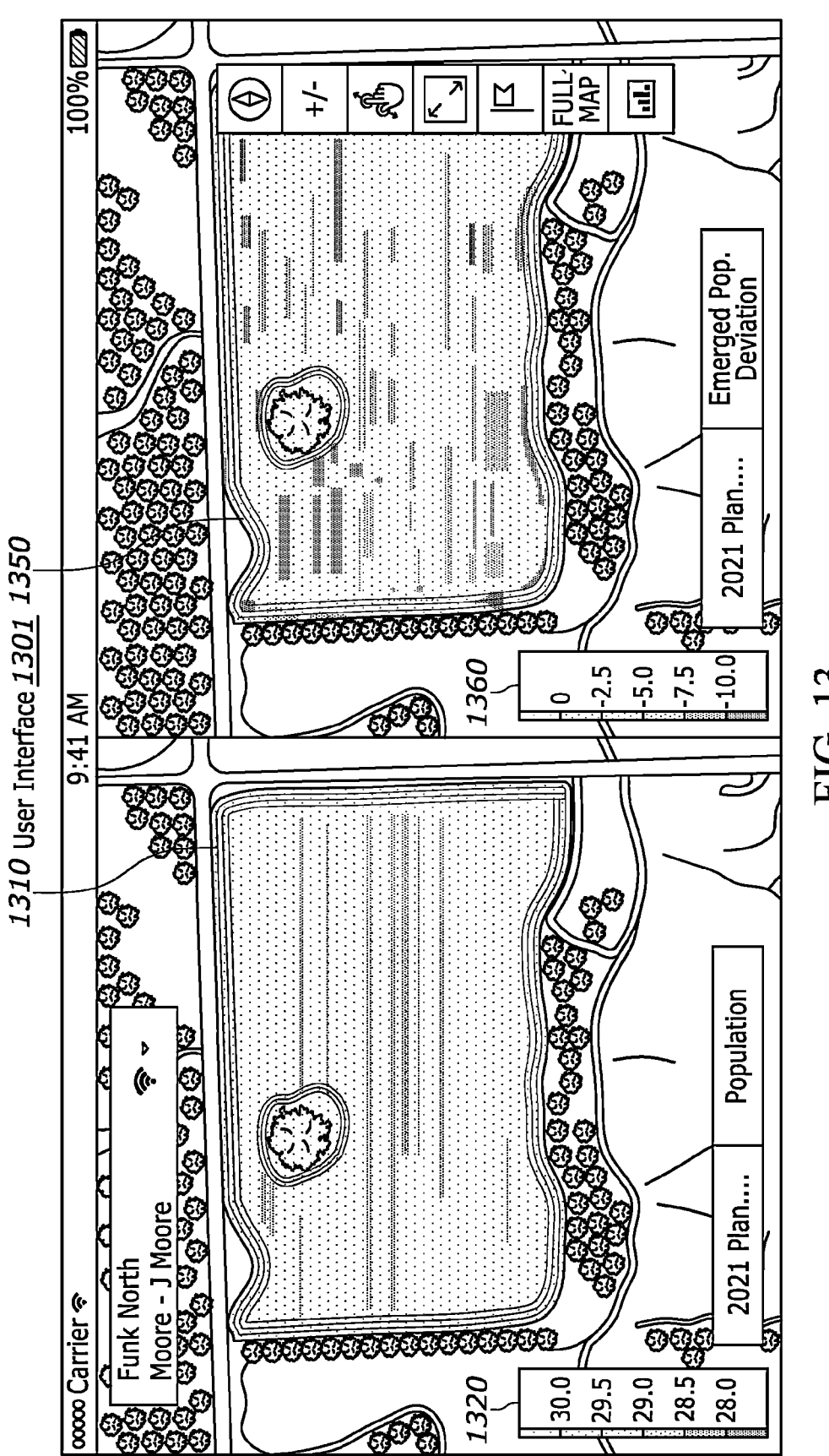
FIG. 13 illustrates a monitor or display device having a user interface 1301 with a split screen view that includes maps of different data layers in accordance with one embodiment.

FIG. 13 illustrates a monitor or display device having a user interface 1301 with a split screen view that includes maps of different data layers in accordance with one embodiment. Processing logic executes instructions of an initiated software application (e.g., field application) of a processing system to generate the user interface 1301 that is displayed by the monitor or display device.

The software application can provide different display regions that are selectable by a user. The map 1310 (e.g., commanded planting population map from a planter, planted population map based on data from a seed sensor) shows a planted population data layer across a field and a scale region 1320 shows seeds per acre in units of 1,000. The map 1350 (e.g., emerged population deviation map based on data from sensors after plants emerge from the soil) shows an emerged population deviation data layer across a field and a scale region 1360 shows emerged population deviation in units of 1,000 with respect to a target or the planted population. Alternatively, the scale regions 1320 and 1360 can show percentages for the planted population and the emerged population deviation, respectively. In one example, a 0% emerged population deviation indicates no difference between the planted population and the emerged population deviation and 100% emerged population deviation indicates that no plants emerged.

Figure 14:
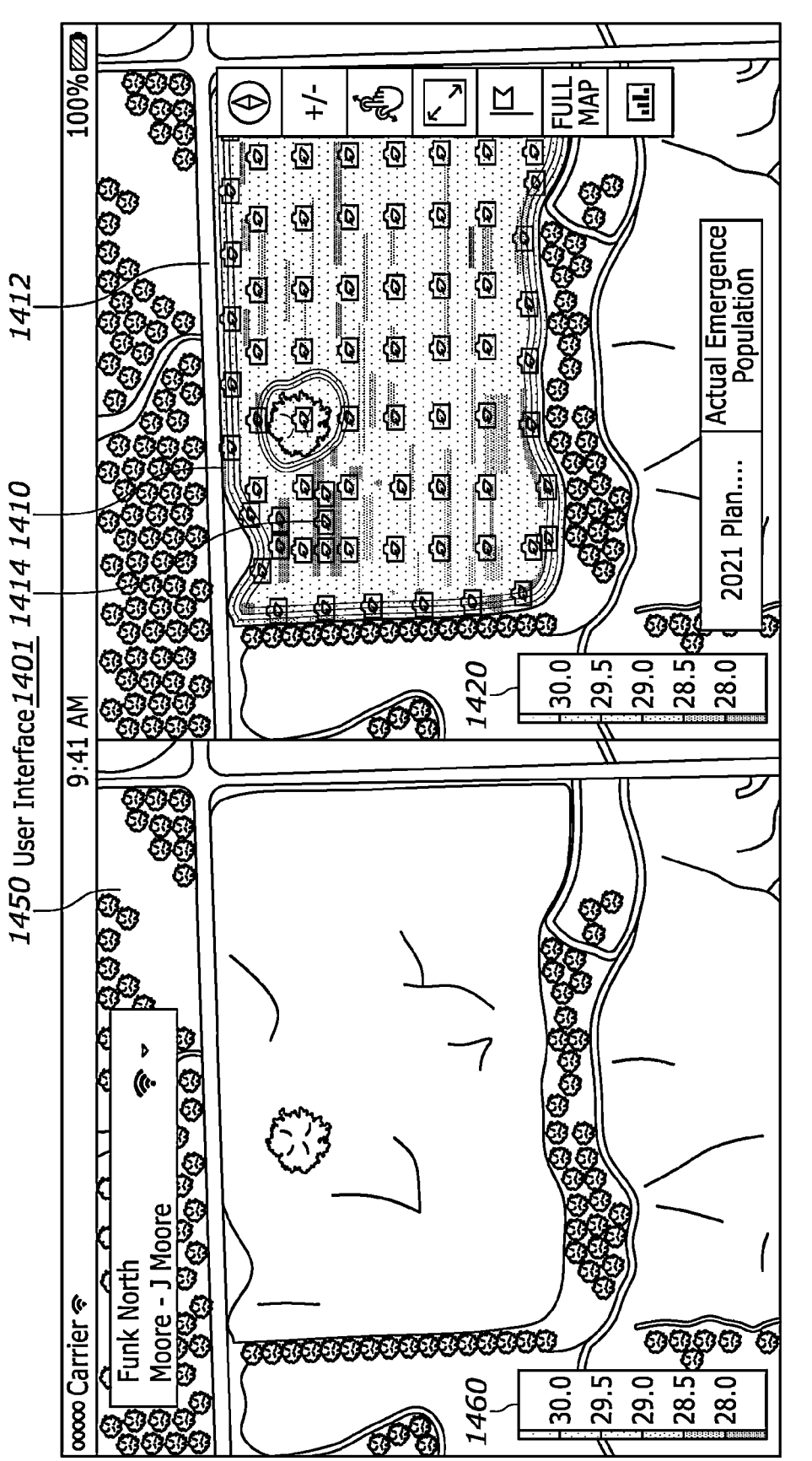
FIG. 14 illustrates a monitor or display device having a user interface 1401 with a split screen view that includes an enhanced map of a data layer with icons and an overview image in accordance with one embodiment.

FIG. 14 illustrates a monitor or display device having a user interface 1401 with a split screen view that includes an enhanced map of a data layer with icons and an overview image in accordance with one embodiment. Processing logic executes instructions of an initiated software application (e.g., field application) of a processing system to generate the user interface 1401 that is displayed by the monitor or display device.

The software application can provide different display regions that are selectable by a user. The enhanced map 1410 (e.g., enhanced actual emergence population map) shows an actual emergence population data layer across a field with selectable icons or symbols for images and a scale region 1420 shows actual emergence population in units of 1,000 (e.g., 28,000 to 30,000 actual emerged plants). The overview image 1450 shows an overview of the field and has a scale region 1460. The images that are represented with icons are captured based on a spatial triggering (e.g., user provides an input prior to or during an application pass to capture an image during the application pass every acre, every 2 acres, every 5 acres, etc.) or threshold triggering (e.g., actual emergence population is below, equal to, or exceeds an actual emergence population threshold) as a machine pulls an implement through a field for an application pass. The icons or symbols (e.g., icon 1412 for spatial triggering, icon 1414 for threshold triggering) and associated captured images are located approximately equidistant from each other for spatially triggering and can be triggered more closely spaced or further apart from each other for threshold triggering as the implement traverses through the field for an application pass. The data layer of the map can also be generated based on capturing images from sensors of an implement, machine, or aerial device.

In one example, a grower provides an input prior to or during a spraying operation for a spatial or grid based triggering of image capturing devices or sensors during the spraying operation. The image capturing devices or sensors capture at least one image for every location that is triggered spatially or based on a grid as defined by the grower.

Figure 15:
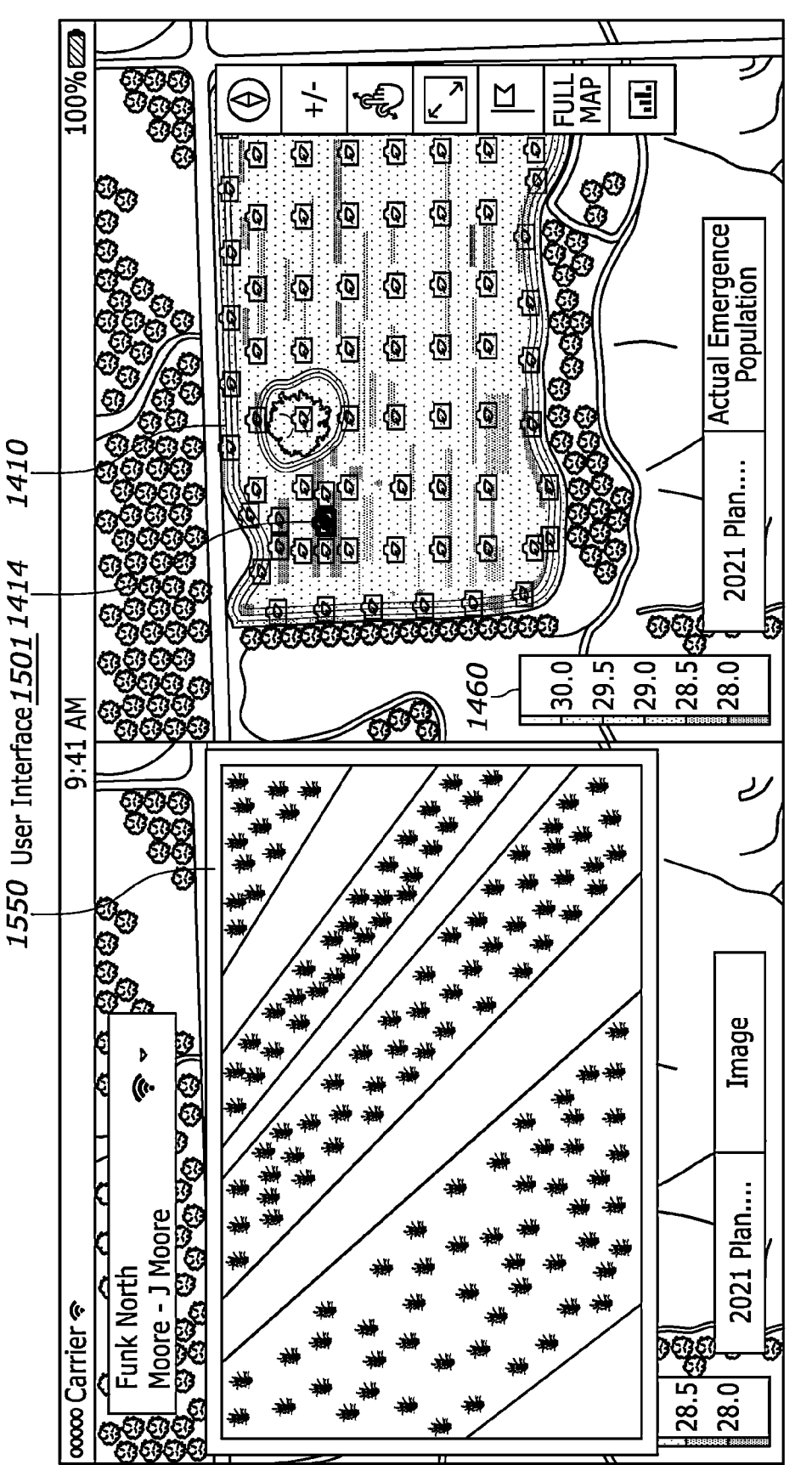
FIG. 15 illustrates a user interface 1501.

Upon selection of the icon 1414, the user interface 1501 is generated as illustrated in FIG. 15. The user interface 1501 includes the emergence population map 1410 and the image 1550 with the image being captured at a location of the icon 1414.

Figure 16:
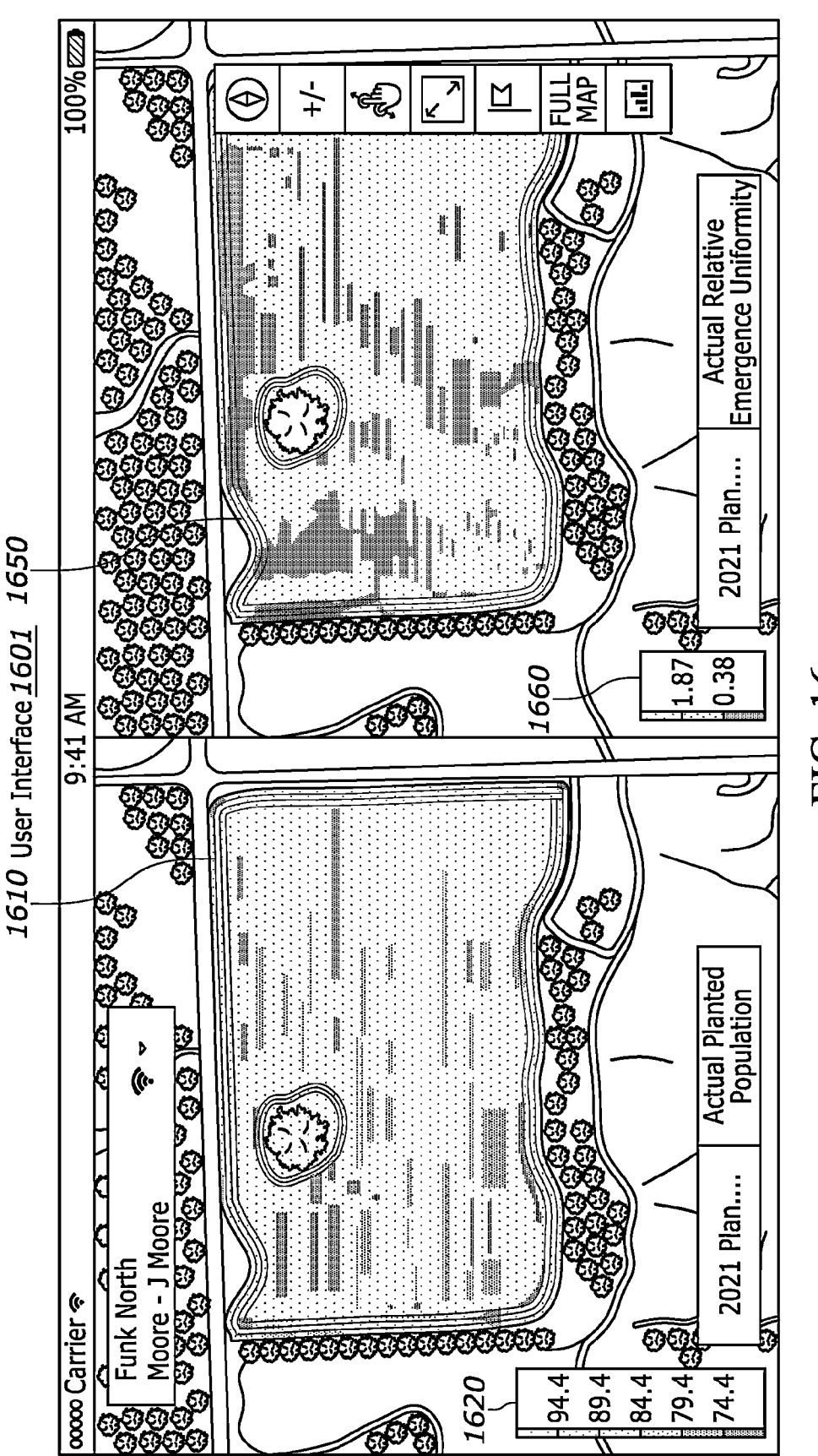
FIG. 16 illustrates a monitor or display device having a user interface 1601 with a split screen view that includes maps of different data layers in accordance with one embodiment.

FIG. 16 illustrates a monitor or display device having a user interface 1601 with a split screen view that includes maps of different data layers in accordance with one embodiment. Processing logic executes instructions of an initiated software application (e.g., field application) of a processing system to generate the user interface 1601 that is displayed by the monitor or display device.

The software application can provide different display regions that are selectable by a user. The map 1610 (e.g., commanded planting population map from a planter, planted population map based on data from a seed sensor) shows a planted population data layer across a field and a scale region 1620 shows seeds per acre in percentages with 94.4-100% being a target seed population. The map 1650 (e.g., actual relative emergence uniformity map based on data from sensors after plants emerge from the soil) shows an actual relative emergence uniformity data layer across a field and a scale region 1660 shows actual relative emergence uniformity in units of growth stages with respect to a target growth stage. The 1.87 and greater stage is the target growth stage, the 0.38-1.87 stage is one growth stage late in emergence, and the 0.38 and lower stage is two growth stages late in emergence. Alternatively, the scale regions 1620 and 1660 can show percentages for the planted population and the actual relative emergence uniformity, respectively. In one example, a 0% actual relative emergence uniformity indicates low uniformity and 100% actual relative emergence uniformity indicates a target uniformity for actual relative emergence uniformity. Various plant phenotype characteristics can be shown with a map or a uniformity map such as growth stage, biomass, plant height, size, and stalk size.

Figure 17:
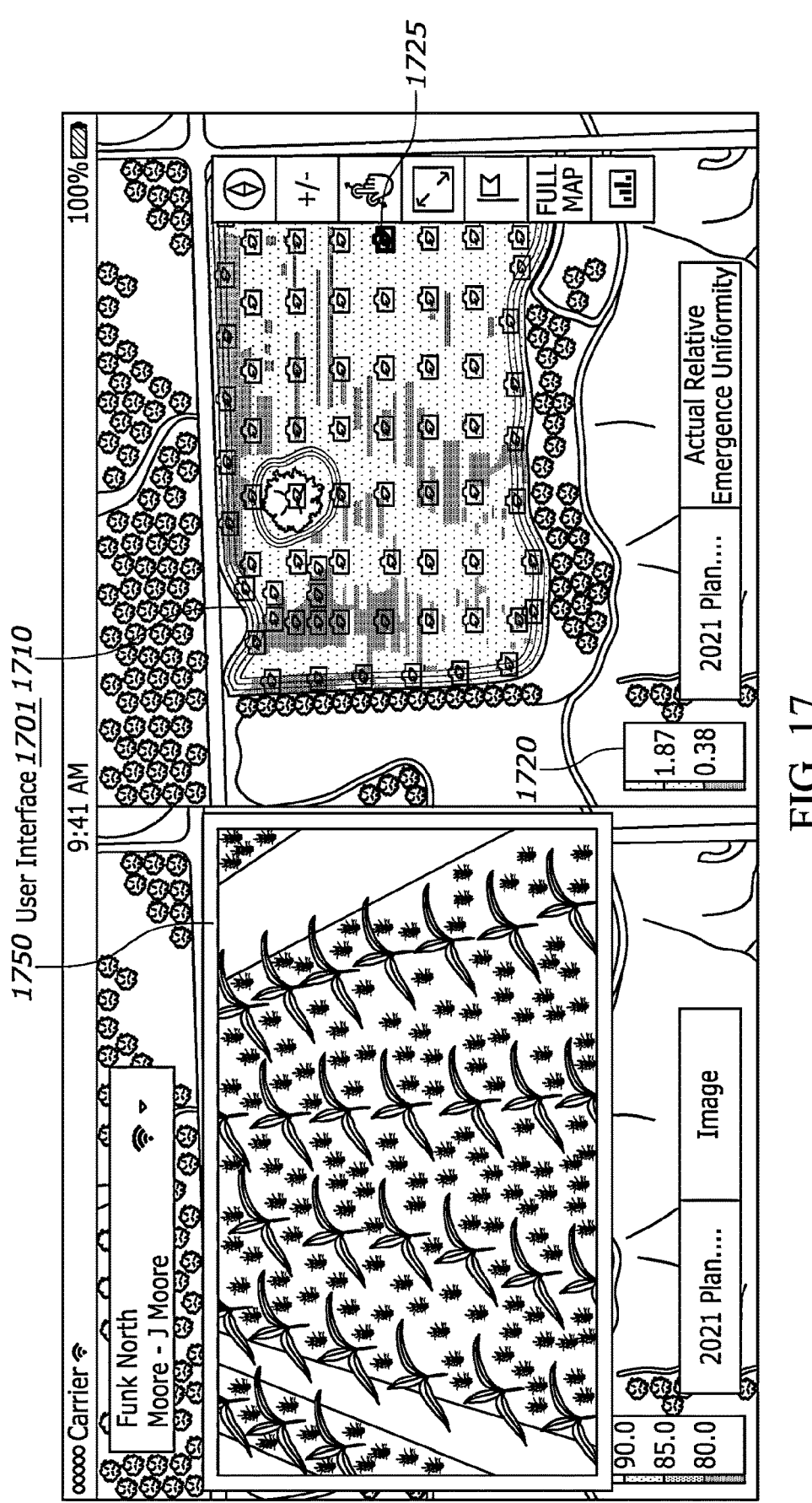
FIG. 17 illustrates a monitor or display device having a user interface 1701 with a split screen view that includes an enhanced map of a data layer with icons and an overview image in accordance with one embodiment.

FIG. 17 illustrates a monitor or display device having a user interface 1701 with a split screen view that includes an enhanced map of a data layer with icons and an overview image in accordance with one embodiment. Processing logic executes instructions of an initiated software application (e.g., field application) of a processing system to generate the user interface 1701 that is displayed by the monitor or display device.

The software application can provide different display regions that are selectable by a user. The enhanced map 1710 (e.g., enhanced actual relative emergence uniformity map) shows an actual relative emergence uniformity data layer across a field with selectable icons for images and a scale region 1720 shows actual relative emergence uniformity on a scale to indicate a target growth stage or growth stages with late emergence. In response to selection of icon 1725, the image 1750 is generated to show plant, weed, and soil conditions at a location of the icon 1725. The image 1750 shows a target relative emergence uniformity for the plants in this image. The images that are represented with icons or symbols are captured based on a spatial triggering (e.g., user provides an input prior to or during an application pass to capture an image during the application pass every acre, every 2 acres, every 5 acres, etc.) or threshold triggering (e.g., actual relative emergence uniformity compares in a predetermined manner (e.g., is below, equal to, or exceeds) an actual relative emergence uniformity threshold) as a machine pulls an implement through a field for an application pass. The icons and associated captured images are located approximately equidistant from each other for spatially triggering and can be triggered more closely spaced or further apart from each other for threshold triggering as the implement traverses through the field for an application pass. The data layer of the map can also be generated based on capturing images from sensors of an implement, machine, or aerial device.

Figure 18:
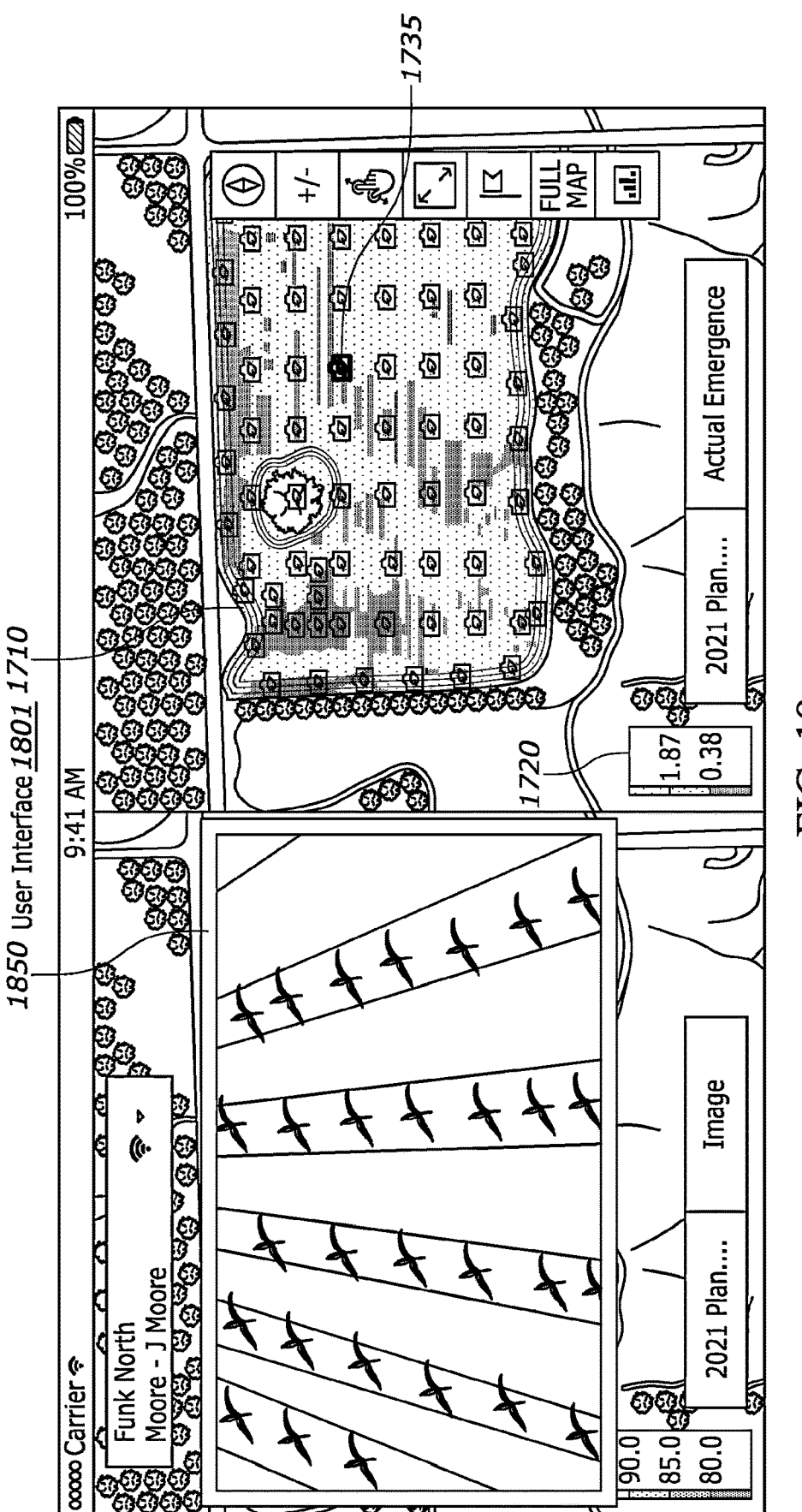
FIG. 18 illustrates that if an icon 1735 is selected from map 1710, then an image 1850 is displayed.

If an icon 1735 is selected from map 1710, then an image 1850 of user interface 1801 of FIG. 18 is displayed. The image 1850 is generated to show plant, weed, and soil conditions at a location of the icon 1735. The image 1850 shows a below target relative emergence uniformity for the plants in this image. The scale region 1720 indicates a relative emergence uniformity. The 1.87 and greater stage is the target growth stage, the 0.38-1.87 stage is one growth stage late in emergence, and the 0.38 and lower stage is two growth stages late in emergence.

Figure 19:
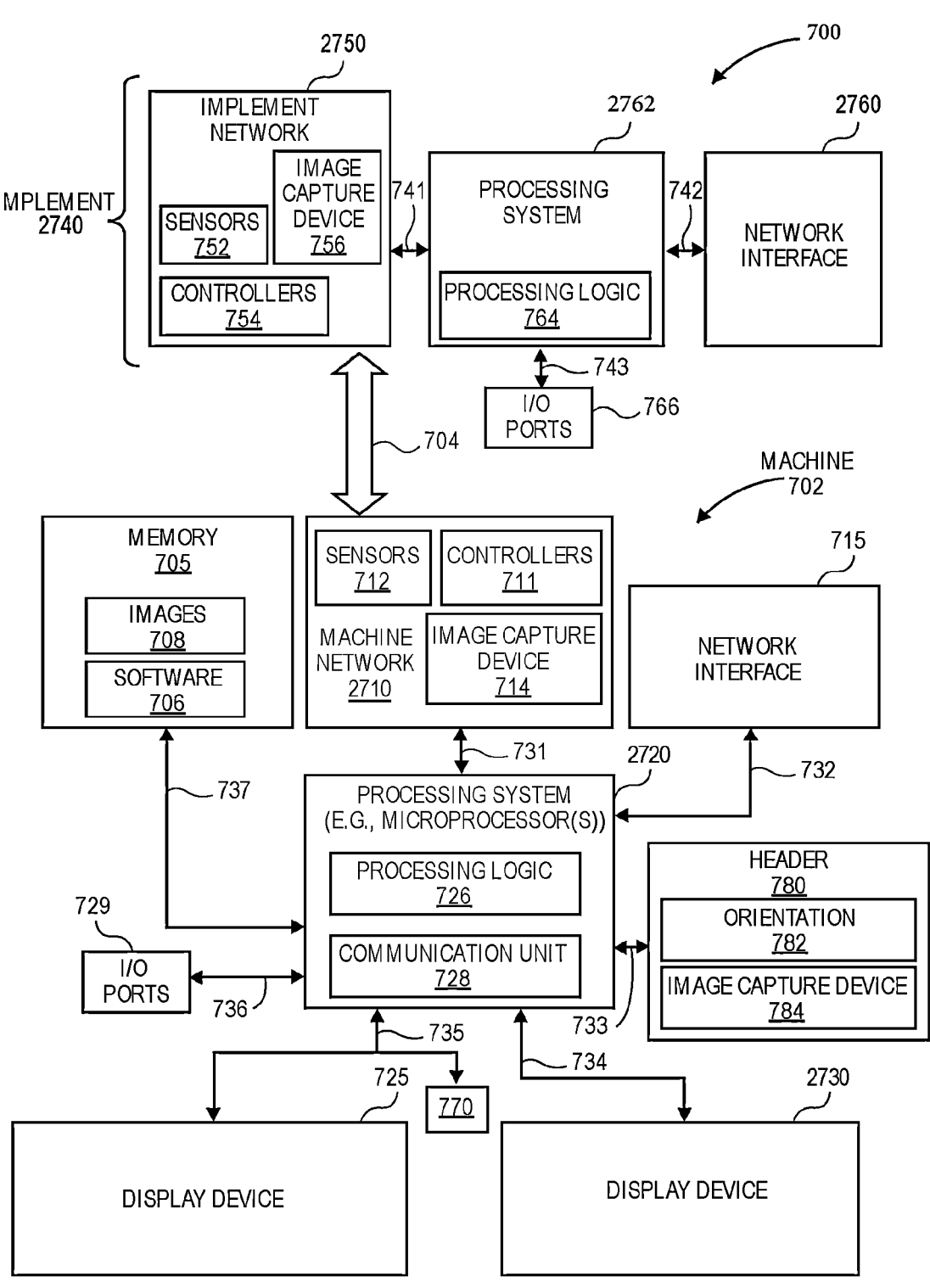
FIG. 19 shows an example of a system 2700 that includes a machine 2702 (e.g., tractor, combine harvester, etc.) and an implement 2740 (e.g., planter, cultivator, plough, sprayer, spreader, irrigation implement, etc.) in accordance with one embodiment.

FIG. 19 shows an example of a system 700 that includes a machine 702 (e.g., tractor, combine harvester, etc.) and an implement 2740 (e.g., planter, cultivator, plough, sprayer, spreader, irrigation implement, etc.) in accordance with one embodiment. The machine 702 includes a processing system 2720, memory 705, machine network 2710 (e.g., a controller area network (CAN) serial bus protocol network, an ISO-BUS network, etc.), and a network interface 715 for communicating with other systems or devices including the implement 2740. The machine network 2710 includes sensors 712 (e.g., speed sensors), controllers 711 (e.g., GPS receiver, radar unit) for controlling and monitoring operations of the machine, and an optional image capture device 714 for capturing images of crops and soil conditions of a field in accordance with embodiments of the present disclosure. The network interface 715 can include at least one of a GPS transceiver, a WLAN transceiver (e.g., WiFi), an infrared transceiver, a Bluetooth transceiver, Ethernet, or other interfaces from communications with other devices and systems including the implement 2740. The network interface 715 may be integrated with the machine network 2710 or separate from the machine network 2710 as illustrated in FIG. 19. The I/O ports 729 (e.g., diagnostic/on board diagnostic (OBD) port) enable communication with another data processing system or device (e.g., display devices, sensors, etc.).

In one example, the machine performs operations of a combine (combine harvester) for harvesting grain crops. The machine combines reaping, threshing, and winnowing operations in a single harvesting operation. An optional header 780 (e.g., grain platform, flex platform) includes a cutting mechanism to cause cutting of crops to be positioned into an auger. The header 780 includes an orientation device 782 or mechanism for orienting a crop (e.g., corn, soybeans) for improving image capture with an image capture device 784.

The processing system 2720 may include one or more microprocessors, processors, a system on a chip (integrated circuit), or one or more microcontrollers. The processing system includes processing logic 726 for executing software instructions of one or more programs and a communication unit 728 (e.g., transmitter, transceiver) for transmitting and receiving communications from the machine via machine network 2710 or network interface 715 or implement via implement network 2750 or network interface 2760. The communication unit 728 may be integrated with the processing system or separate from the processing system. In one embodiment, the communication unit 728 is in data communication with the machine network 2710 and implement network 2750 via a diagnostic/OBD port of the I/O ports 729.

Processing logic 726 including one or more processors may process the communications received from the communication unit 728 including agricultural data. The system 700 includes memory 705 for storing data and programs for execution (software 706) by the processing system. The memory 705 can store, for example, software components such as image capture software, software for customizing scale and corresponding field views of agricultural fields with expand and panning operations for performing operations or methods of the present disclosure, or any other software application or module, images (e.g., captured images of crops), alerts, maps, etc. The memory 705 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

The processing system 2720 communicates bi-directionally with memory 705, machine network 2710, network interface 715, header 780, display device 2730, display device 725, and I/O ports 729 via communication links 731-737, respectively.

Display devices 725 and 2730 can provide visual user interfaces for a user or operator. The display devices may include display controllers. In one embodiment, the display device 725 (or computing device 725) is a portable tablet device or computing device with a touchscreen that displays images (e.g., captured images, localized view map layer, high definition field maps of as-planted or as-harvested data or other agricultural variables or parameters, yield maps, alerts, etc.) and data generated by an agricultural data analysis software application or field view software application and receives input (e.g., expand (positive expansion, negative expansion or contraction), panning) from the user or operator for a customized scale region and corresponding view of a region of a field, monitoring and controlling field operations, or any operations or methods of the present disclosure. The processing system 2720 and memory 705 can be integrated with the computing device 725 or separate from the computing device. The operations may include configuration of the machine or implement, reporting of data, control of the machine or implement including sensors and controllers, and storage of the data generated. The display device 2730 may be a display (e.g., display provided by an original equipment manufacturer (OEM)) that displays images and data for a localized view map layer, as-planted or as-harvested data, yield data, controlling a machine (e.g., planter, tractor, combine, sprayer, etc.), steering the machine, and monitoring the machine or an implement (e.g., planter, combine, sprayer, etc.) that is connected to the machine with sensors and controllers located on the machine or implement.

A cab control module 770 may include an additional control module for enabling or disabling certain components or devices of the machine or implement. For example, if the user or operator is not able to control the machine or implement using one or more of the display devices, then the cab control module may include switches to shut down or turn off components or devices of the machine or implement.

The implement 2740 (e.g., planter, cultivator, plough, sprayer, spreader, irrigation implement, etc.) includes an implement network 2750, a processing system 2762, a network interface 2760, and optional input/output ports 766 for communicating with other systems or devices including the machine 702. The implement network 2750 (e.g., a controller area network (CAN) serial bus protocol network, an ISOBUS network, etc.) includes an image capture device 756 for capturing images of crop development and soil conditions, sensors 752 (e.g., speed sensors, seed sensors for detecting passage of seed, downforce sensors, actuator valves, OEM sensors, etc.), controllers 754 (e.g., GPS receiver), and the processing system 2762 for controlling and monitoring operations of the machine. The OEM sensors may be moisture sensors or flow sensors for a combine, speed sensors for the machine, seed force sensors for a planter, liquid application sensors for a sprayer, or vacuum, lift, lower sensors for an implement. For example, the controllers may include processors in communication with a plurality of seed sensors. The processors are configured to process images captured by image capture device 756 or seed sensor data and transmit processed data to the processing system 2762 or 2720. The controllers and sensors may be used for monitoring motors and drives on a planter including a variable rate drive system for changing plant populations. The controllers and sensors may also provide swath control to shut off individual rows or sections of the planter. The sensors and controllers may sense changes in an electric motor that controls each row of a planter individually. These sensors and controllers may sense seed delivery speeds in a seed tube for each row of a planter.

The network interface 2760 can be a GPS transceiver, a WLAN transceiver (e.g., WiFi), an infrared transceiver, a Bluetooth transceiver, Ethernet, or other interfaces from communications with other devices and systems including the machine 702. The network interface 2760 may be integrated with the implement network 2750 or separate from the implement network 2750 as illustrated in FIG. 19.

The processing system 2762 communicates bi-directionally with the implement network 2750, network interface 2760, and I/O ports 766 via communication links 741-743, respectively.

The implement communicates with the machine via wired and possibly also wireless bi-directional communications 704. The implement network 2750 may communicate directly with the machine network 2710 or via the network interfaces 715 and 2760. The implement may also by physically coupled to the machine for agricultural operations (e.g., planting, harvesting, spraying, etc.).

The memory 705 may be a machine-accessible non-transitory medium on which is stored one or more sets of instructions (e.g., software 706) embodying any one or more of the methodologies or functions described herein. The software 706 may also reside, completely or at least partially, within the memory 705 and/or within the processing system 2720 during execution thereof by the system 700, the memory and the processing system also constituting machine-accessible storage media. The software 706 may further be transmitted or received over a network via the network interface device 715.

In one embodiment, a machine-accessible non-transitory medium (e.g., memory 705) contains executable computer program instructions which when executed by a processing system cause the system to perform operations or methods of the present disclosure including customizing scale and corresponding field views of agricultural fields with expand and panning operations. While the machine-accessible non-transitory medium (e.g., memory 705) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present disclosure. The term "machine-accessible non-transitory medium" shall accordingly be taken to include, but not be limited to, solid-state memories, optical and magnetic media, and carrier wave signals.

Prior approaches for stand count determine a number of planted seeds and a number of growing plants per unit area. An expected result based on the number of planted seeds is compared to the number of growing plants to calculate a percentage. Stand count is used to evaluate seed quality (germination rate) and whether replanting is needed or not.

Described herein are systems and methods for using sensors of agricultural implements or machines to capture images of crop emergence during different crop stages, determine a uniformity of the crop emergence, and quantify the uniformity of crop emergence.

FIGS. 20A and 20B illustrate a flow diagram of one embodiment for a computer implemented method of determining and quantifying crop emergence uniformity within an agricultural field. The method 2000 is performed by processing logic that may comprise hardware (circuitry, dedicated logic, etc.), software (such as is run on a general purpose computer system or a dedicated machine or a device), or a combination of both. In one embodiment, the computer implemented method 2000 is performed by processing logic of a processing system of a system 102, machine, apparatus, implement, agricultural vehicle, aerial device, monitor, display device, user device, self-guided device, or self-propelled device (e.g., robot, ATV, UTV, etc.). The processing system executes instructions of a software application or program with processing logic. The software application or program can be initiated by the processing system. In one example, a monitor or display device receives user input and provides a customized display for operations of the method 2000.

At operation 2002, a software application is initiated on the processing system and displayed on a monitor or display device as a user interface. The processing system may be integrated with or coupled to a machine that performs an application pass (e.g., planting, tillage, fertilization, spraying, etc.). Alternatively, the processing system may be integrated with an apparatus (e.g., drone, image capture device) associated with the machine that captures images before, during, or after the application pass. In one example, the user interface includes a map of a data layer (e.g., seed data, commanded planter seed population, actual seed population determined from a seed sensor, a seed population deviation, singulation data, weed map, emergence data, emergence map, emergence environment score based on a combination of temperature and moisture correlated to how long a seed takes to germinate, emergence environment score based on a percentage of seeds planted that will germinate within a selected number of days, time to germination, time to emergence, seed germination risk) for a field of interest and an overview image of the field of interest.

Seed germination risk can be germination/emergence (no germination/emergence, on time germination/emergence, or late germination/emergence) or factors other than time, such as, deformities, damaged seed, reduced vigor, or disease. Seed germination risk can be high, medium, or low, or it can be on-time emergence, late emergence, or no emergence.

The data layer can be generated from data collected by sensors on an implement, a machine pulling the implement during a current application pass, an aerial device, a user device, a self-guided device, a self-propelled device, etc., or the data layer can be generated from a previous application pass through the field. The sensors may be in-situ sensors positioned on each row unit of an implement, spaced across several row units, or positioned on a machine.

At operation 2004, the computer implemented method includes obtaining one or more images of biomass data for a region of interest of a field from one or more sensors of an agricultural implement, which can be traversing the field to obtain the biomass data for various crop stages or for an application pass. Alternatively, the sensors can be located on a machine, an agricultural vehicle, an aerial device, a drone, a self-propelled device (e.g., robot, off-road vehicle, ATV, UTV), to collect agricultural data before, during, or after an application pass. At operation 2006, the computer implemented method partitions a captured image into tiles. In one example, the tiles (e.g., n×m array of tiles) cover an entire image and additional adjacent tiles (e.g., left center, right center) that overlap the tiles are also utilized. At operation 2008, the computer implemented method provides the tiles as input to a deep learning model (DLM) to differentiate pixels of the tiles between a targeted type of vegetation (e.g., a crop, corn, soybean, wheat, etc.), a background, or other vegetation. The tile can correspond to one or more images that are provided to the DLM. A single high resolution image or a resized lower resolution image can be provided in alternative embodiments.

Figure 22:
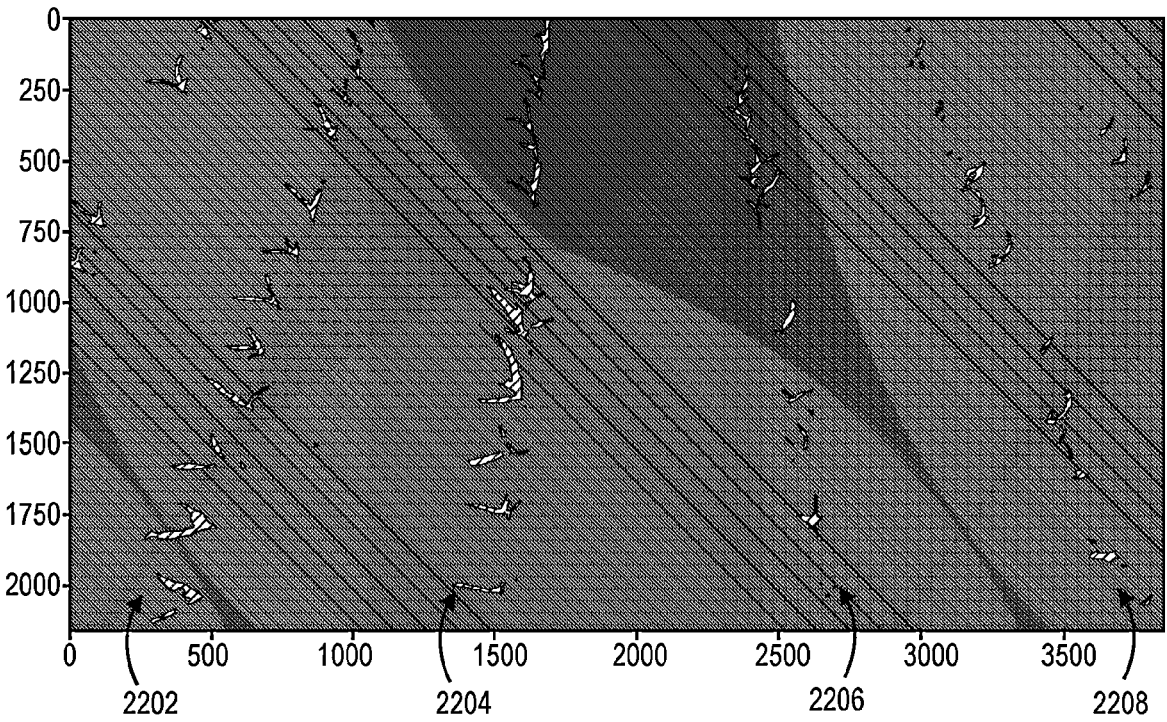
FIG. 22 illustrates a sample predicted output from a deep learning model (DLM) in accordance with one embodiment.

At operation 2010, the computer implemented method receives output from the DLM in terms of modeled tiles with predicted pixel values (e.g., 1 for targeted vegetation, 0 for weeds or other non-targeted vegetation) and reassembles the modeled tiles on a per tile basis to display the targeted type of vegetation in dimensionality of the original one or more images. A sample predicted output from the DLM is illustrated in diagram 2200 of FIG. 22. The rows 2202, 2204, 2206, 2208 of crops represent predicted pixel values (e.g., 1 for targeted vegetation, 0 for weeds or other non-targeted vegetation) for targeted vegetation.

At operation 2012, the computer implemented method resolves conflicts (e.g., ties or disagreements) for pixel classification from overlapping tiles with voting. In one example, if an odd number of tiles overlap a region, then a majority vote determines a truth (e.g., 1 for targeted vegetation, 0 for weeds or other non-targeted vegetation) for pixel classification. Alternatively, a logical "OR" operation can be applied to the odd number of overlapping tiles such that if any overlapping tile identifies a targeted type of vegetation then the region is classified with the targeted type of vegetation.

In another example, if an even number of tiles overlap a region, then a logical OR operation can be applied to the even number of overlapping tiles such that if any overlapping tile identifies a targeted type of vegetation then the region is classified with the targeted type of vegetation.

At operation 2014, the computer implemented method applies a predetermined mask (e.g., binary mask, mask 2100 of FIG. 21) to select portions of the one or more images that correspond with the targeted type of vegetation pixels.

Regions of interest (e.g., region 1 is first row of crop, region 2 is second row of the crop, etc.) that align with crop rows can be provided via the predetermined mask that prescribes portions of the image that correspond with a row of a targeted vegetation or crop, or the selected portions can be inferred via the presence and orientation of specific types of vegetation that are detected via images.

For the selected portions of the one or more images, the method accumulates the targeted type of vegetation pixels to create one or more rows of crops (e.g., vertical lines) corresponding to vegetation intensity at operation 2016. In one example, for each region of the image corresponding to a crop row, detected vegetation pixels that represent biomass are accumulated horizontally to create the one or more rows of crops corresponding to vegetation biomass intensity.

Figure 24:
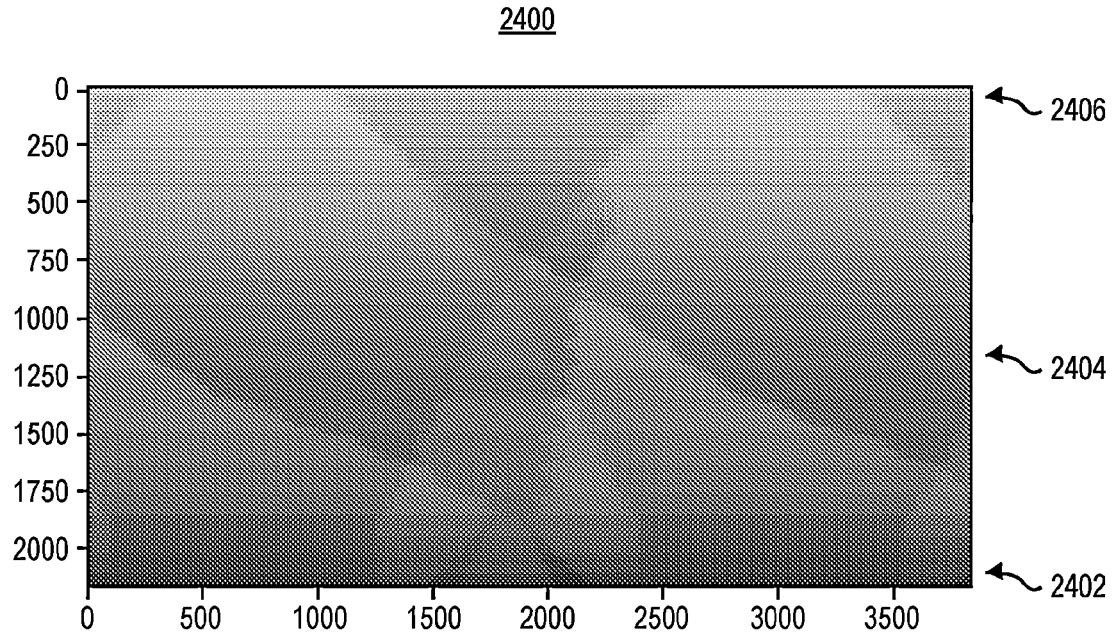
FIG. 24 illustrates a weighted value diagram 2400 that can be applied to the entire one or more rows of crops in the event that the image plane (e.g., forward looking image plane with upward tilt) of a sensor (e.g., camera) is not coplanar with the ground surface in accordance with one embodiment.

At operation 2018, the computer implemented method applies a filter (e.g., one-dimensional filter) with a length corresponding to the spacing in pixels between individual plants of the targeted type of plants along a row of plant intensity (e.g., vertical line of plant intensity) to determine a simple moving average or a weighted average of vegetation intensity of the targeted type of plants. In one example, a one-dimensional filter with a length corresponding to the spacing in pixels between individual plants is convolved along the row of plant intensity. The filter can be uniform to represent a simple moving average, or weighted to produce a weighted average of vegetation along the row (or vertical line) of vegetation intensity At optional operation 2020, additional weights 2402 (e.g., weighted value less than 1), 2404 (e.g., weighted value equal to 1 near center of image), 2406 (e.g., weighted value greater than 1) as illustrated in the weighted value diagram 2400 of FIG. 24 can be applied to the entire one or more rows of crops in the event that the image plane (e.g., forward looking image plane with upward tilt) of a sensor (e.g., camera) is not coplanar with the ground surface. In one example, the sensor can have a tilt from 0 degrees (coplanar with ground plane so no weighting is needed) to 45 degrees. This allows adjustment for pixels at the top of the image representing a different ground surface area (e.g., larger ground surface area) than pixels at the bottom of the image. Alternatively, a camera that is not coplanar with a ground surface can involve having a perspective warp applied to the captured image to match coplanar perspective with the ground surface and thus compensative for the camera not being coplanar with the ground surface.

A forward-looking image plane with upward tilt allows the sensors to capture images of a region of plants prior to an implement reaching the region of the plants and thus allows time for the implement to adjust parameters of an agricultural application if necessary prior to reaching the region of the plants.

At operation 2022, the adjusted vegetation intensity along the one or more rows of crops (e.g., one or more vertical lines) can be thresholded for a minimum vegetation intensity, revealing portions of a crop row with little or no presence of the desired vegetation. The adjusted vegetation intensity along the one or more rows of crops (one or more vertical lines) can be thresholded for a maximum vegetation intensity, revealing portions of a crop row with too much of the desired vegetation.

At operation 2024, the computer implemented method determines a targeted plant uniformity (e.g., emergence score) based on the simple moving average or a weighted average of the targeted type of plants and the thresholding for minimum and maximum vegetation intensity. The portion of the crop row (or vertical line) meeting both upper and lower thresholding criteria can represent an emergence score between 0 and 1 or between 0 and 100%. The emergence score indicates a distribution of the targeted vegetation over the region of interest.

Figure 21:
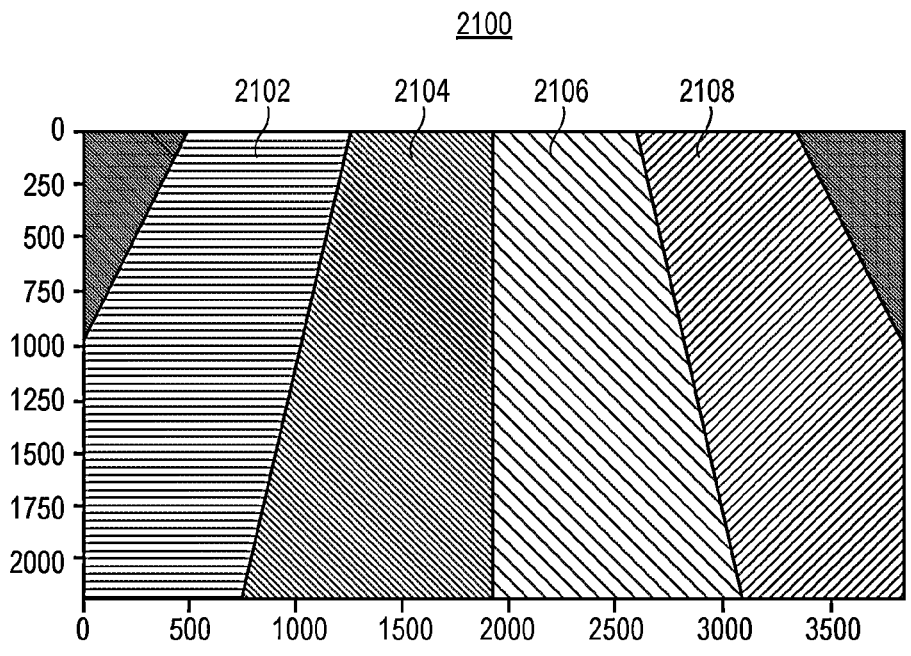
FIG. 21 illustrates an example of a predetermined mask to select portions of an image in accordance with one embodiment.

FIG. 21 illustrates an example of a predetermined mask to select portions of an image in accordance with one embodiment. The predetermined mask 2100 shows a number of pixels on the x axis and y axis and includes regions of interest 2102, 2104, 2106, 2108 (e.g., region 2102 is first row of crop, region 2104 is second row of the crop, etc.) that align with crop rows to prescribe portions of the image that correspond with a row of a targeted vegetation or crop. Alternatively, the regions can be inferred based on orientation of vegetation from the model output.

Figure 23:
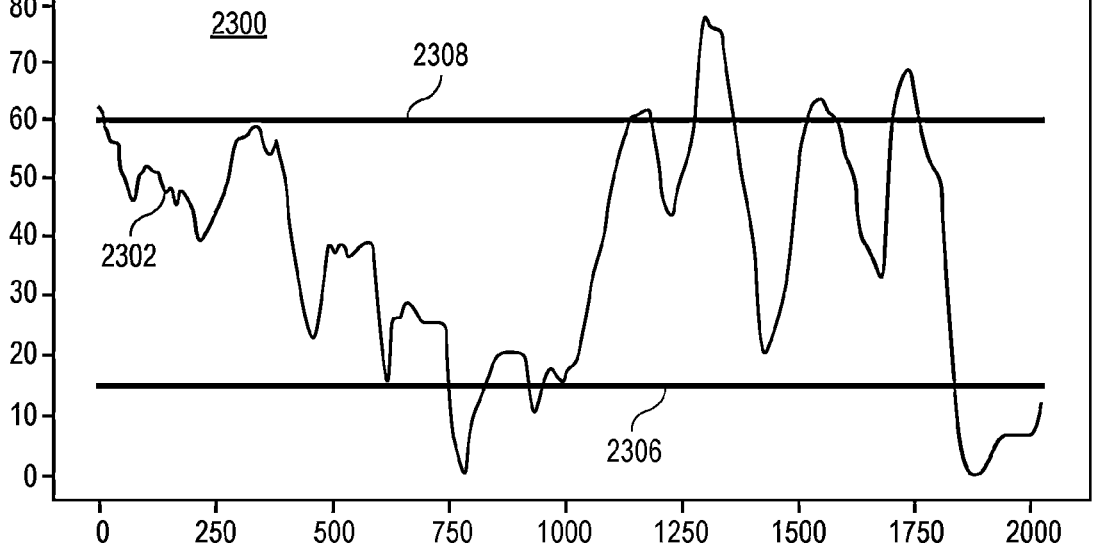
FIG. 23 illustrates an example of a moving average of vegetation intensity or a weighted average of vegetation intensity along a row in accordance with one embodiment.

FIG. 23 illustrates an example of a moving average of vegetation intensity or a weighted average of vegetation intensity along a row in accordance with one embodiment. The moving or weighted average of vegetation intensity 2302 is determined based on operation 2018 of FIG. 20. The diagram 2300 shows the moving or weighted average on a y axis and a pixel position of adjusted vegetation intensity from a bottom to a top of an image on an x axis. In one example, the moving average of vegetation intensity or a weighted average of vegetation intensity 2302 along a row is determined moving from a top to bottom of an image after convolution with a 1 dimensional filter. Upper threshold 2308 and lower threshold 2306 are shown as horizontal lines representing areas of the image with too much biomass if above the threshold 2308 or too little biomass if below threshold 2306. An emergence score (e.g., 0 to 100%) is determined based on a portion of the biomass that is greater than the lower threshold 2306 and less than the upper threshold 2308. The emergence score can be determined based on a percent of time that the moving average of vegetation intensity is greater than the lower threshold 2306 and less than the upper threshold 2308.

Any of the following examples can be combined into a single embodiment or these examples can be separate embodiments. In one example of a first embodiment, a computer implemented method for customizing field views of data displays comprises obtaining a data layer for an agricultural parameter from sensors of an agricultural implement or machine during an application pass for a field and generating a user interface with an enhanced map that includes the data layer for the agricultural parameter and selectable icons overlaid at different geographic locations on the enhanced map for the field.

In one example of the second embodiment, a computing device comprises a display device for displaying a user interface having a scale region and a field region for an agricultural parameter; and a processor coupled to the display device. The processor is configured to generate a data layer for the agricultural parameter from sensors of an agricultural implement or machine that collect the data during an application pass for a field and to generate the user interface with an enhanced map that includes the data layer for the agricultural parameter and selectable icons overlaid at different geographic locations on the enhanced map for the field.

In one example of a third embodiment, computer implemented method for customizing field views of a field region of data displays comprises obtaining a data layer for an agricultural parameter from sensors of an agricultural implement or machine that collects data during an application pass for a field and generating selectable icons and overlaying the selectable icons at different geographic locations on an enhanced map of the data layer for the field based on spatial trigger or a threshold trigger for the agricultural parameter.

EXAMPLES

The following are nonlimiting examples.

Example 1—A computer implemented method for customizing field views of a display device comprising: obtaining a data layer for an agricultural parameter from sensors of an agricultural implement during an application pass for a field; and generating a user interface with an enhanced map that includes the data layer for the agricultural parameter and selectable icons overlaid at different geographic locations on the enhanced map for the field.

Example 2—the computer implemented method of Example 1, wherein the user interface further comprises a split screen view with the enhanced map on a first side of the split screen view and an overview image of the field on a second side of the split screen view.

Example 3—the computer implemented method of any preceding Example, wherein the agricultural implement comprises a planter, sprayer, or irrigation implement having row units with each row unit having a sensor for capturing images to obtain the data layer.

Example 4—the computer implemented method of Example 3, further comprising: displaying the user interface with the enhanced map on the display device; receiving a user input to select an icon of the enhanced map; and generating an updated user interface with the enhanced map and an image that is associated with the selected icon changing color on the enhanced map.

Example 5—the computer implemented method of Example 4, wherein the image is displayed as a pop up window or over an overview image of the field.

Example 6—the computer implemented method of Example 5, wherein the enhanced map provides an ability to select icons throughout the field to show actual captured images of crops, weeds, and conditions of soil of the field.

Example 7—the computer implemented method of any of Examples 1 to 6, wherein the selectable icons are generated and overlaid at different geographic locations on the enhanced map for the field based on a spatial trigger within the field, a threshold trigger for when an agricultural parameter exceeds a threshold for the agricultural parameter, a time based trigger for capturing images, or a burst capture of images.

Example 8—the computer implemented method of any of Examples 1 to 6, wherein the selectable icons are generated and overlaid at different geographic locations on the enhanced map for the field based on a threshold trigger including a weed density exceeding a threshold trigger for weed density or an emergence value exceeding a threshold trigger for emergence data.

Example 9—the computer implemented method of any preceding Example, wherein the agricultural parameter comprises one or more of seed data, commanded planter seed population, actual seed population determined from a seed sensor, a seed population deviation, singulation data, weed map, emergence data, emergence map, emergence environment score based on a combination of temperature and moisture correlated to how long a seed takes to germinate, emergence environment score based on a percentage of seeds planted that will germinate within a selected number of days, time to germination, time to emergence, and seed germination risk.

Example 10—A computing device comprising: a display device for displaying a user interface having a scale region and a field region for an agricultural parameter; and a processor coupled to the display device, the processor is configured to generate a data layer for the agricultural parameter from sensors of an agricultural implement that collects the data during an application pass for a field and to generate the user interface with an enhanced map that includes the data layer for the agricultural parameter and selectable icons or symbols overlaid at different geographic locations on the enhanced map for the field.

Example 11—the computing device of Example 10, wherein the user interface further comprises a split screen view with the enhanced map on a first side of the split screen view and an overview image of the field on a second side of the split screen view.

Example 12—the computing device of Example 10 or 11, wherein the agricultural implement comprises a planter, sprayer, or irrigation implement having row units with each row unit having a sensor for capturing images to obtain the data layer.

Example 13—the computing device of Example 12, wherein the display device to display the user interface with the enhanced map and to receive a user input to select an icon of the enhanced map, wherein the processor is configured to generate an updated user interface with the enhanced map and an image that is associated with a selected icon or symbol based on the user input with the selected icon or symbol changing color.

Example 14—the computing device of Example 13, wherein the updated user interface to provide a selectable orientation option to rotate an orientation of the images of the user interface, a selectable expand option to control sizing of a displayed map in a field region, a selectable icon or symbol option to enable or disable showing icons or symbols on the enhanced map, a selectable full map option to switch between a full screen view of map versus a split screen view having both of a map and an overview image, and a selectable statistics option to show statistics for the data layer.

Example 15—the computing device of any of Examples 10 to 14, wherein the display device to receive a user input to modify the scale region and to display a modified scale region and a corresponding modified field region.

Example 16—A computer implemented method for customizing field views of a field region comprising: obtaining a data layer for an agricultural parameter from sensors of an agricultural implement that collects data during an application pass for a field; and generating selectable icons and overlaying the selectable icons at different geographic locations on an enhanced map of the data layer for the field based on spatial trigger or a threshold trigger for the agricultural parameter.

Example 17—the computer implemented method of Example 16, further comprising: comparing the agricultural parameter to the threshold trigger; determining whether the agricultural parameter exceeds the threshold trigger for a location within the field; and generating a selectable icon when the agricultural parameter exceeds the threshold trigger for the location within the field.

Example 18—the computer implemented method of Example 17, wherein the threshold trigger comprises a weed threshold that is compared to a weed density.

Example 19—the computer implemented method of Example 17, wherein the threshold trigger comprises an emergence threshold that is compared to an emergence value for plant emergence data.

Example 20—the computer implemented method of any of Examples 16 to 19, further comprising: displaying a user interface with the enhanced map that includes the data layer for the agricultural parameter and the selectable icons overlaid at different geographic locations on the enhanced map for the field.

Example 21—the computer implemented method of any of Examples 16 to 19, wherein the agricultural implement comprises a planter, sprayer, or irrigation implement having row units with each row unit having a sensor for capturing images to obtain the data layer.

Example 22—A computer implemented method for measuring and quantifying crop emergence uniformity within an agricultural field comprises obtaining one or more images of biomass data for a region of interest within the agricultural field from one or more sensors of an agricultural implement, which can be traversing the field to obtain the biomass data for various crop stages or for an application pass. The computer implemented method partitions a captured image into tiles, provides the tiles to a deep learning model to provide modeled tiles with predicted pixel values (e.g., 1 for targeted vegetation, 0 for weeds or other non-targeted vegetation) and reassembles the modeled tiles on a per tile basis to display the targeted type of vegetation in dimensionality of the original one or more images.

Example 23—the computer implemented method of Example 22, further comprising: applying a predetermined mask to select portions of the one or more images that correspond with the targeted type of vegetation pixels.

Example 24—the computer implemented method of any of Examples 22-23, further comprising: accumulating the targeted type of vegetation pixels to create one or more rows of crops (e.g., vertical lines) corresponding to vegetation intensity.

Example 25—the computer implemented method of any of Examples 22-24, further comprising: applying a filter (e.g., one-dimensional filter) with a length corresponding to spacing in pixels between individual plants of the targeted type of plants along a row of plant intensity (e.g., vertical line of plant intensity) to determine a simple moving average or a weighted average of vegetation intensity for the targeted type of plants Example 26—the computer implemented method of any of Examples 22-25, further comprising: applying upper and lower thresholds to the simple moving average or a weighted average of vegetation intensity along the one or more rows of crops (one or more vertical lines) and determining a targeted plant uniformity based on the simple moving average or a weighted average of vegetation intensity of the targeted type of plants and the thresholding for lower (minimum) and upper (maximum) vegetation intensity. The portion of the crop row (or vertical line) meeting both thresholding criteria can represent an emergence score between 0 and 100%.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:
1. A computer implemented method comprising:
obtaining a data layer for an agricultural parameter from sensors of an agricultural implement during an application pass for a field; generating a user interface with an enhanced map that includes the data layer for the agricultural parameter; and generating selectable icons overlaid at different geographic locations on the enhanced map for the field with the selectable icons representing captured images at the different geographic locations, wherein the user interface further comprises a split screen view with the enhanced map that includes the data layer for the agricultural parameter and a first scale region to show a scale for the agricultural parameter on a first side of the split screen view and an overview image of the field and a second scale region on a second side of the split screen view; and wherein the agricultural parameter comprises one or more of seed data, commanded planter seed population, actual seed population determined from a seed sensor, a seed population deviation, singulation data, weed map, emergence data, emergence map, emergence environment score based on a combination of temperature and moisture correlated to how long a seed takes to germinate, emergence environment score based on a percentage of seeds planted that will germinate within a selected number of days, time to germination, time to emergence, and seed germination risk.

2. The computer implemented method of claim 1, wherein the user interface further comprises the split screen view with the enhanced map on the first side of the split screen view and the overview image of the field, the second scale region, and one or more of a selectable orientation option to rotate an orientation of the images of the user interface with respect to a true North direction, a selectable plus/minus zoom option, a selectable pinch to zoom option, a selectable expand option to control sizing of a displayed map in a field region, a selectable icon option to enable or disable showing image icons or symbols on the map, a selectable full map option to switch between different viewing options including a full screen view or a split screen view and a selectable statistics option to show statistics for the data layer on the second side of the split screen view.

3. The computer implemented method of claim 1, wherein the agricultural implement comprises a planter, sprayer, or irrigation implement having row units with each row unit having a sensor for capturing images to obtain the data layer.

4. The computer implemented method of claim 3, further comprising:

displaying the user interface with the enhanced map on the display device;

receiving a user input to select an icon of the enhanced map; and generating an updated user interface with the enhanced map and an image that is associated with the selected icon changing color on the enhanced map.

5. The computer implemented method of claim 4, wherein the image is displayed as a pop up window or over an overview image of the field.

6. The computer implemented method of claim 5, wherein the enhanced map provides an ability to select icons throughout the field to show actual captured images of crops, weeds, and conditions of soil of the field.

7. The computer implemented method of claim 1, wherein the selectable icons are generated and overlaid at different geographic locations on the enhanced map for the field based on a spatial trigger to capture an image during the application pass per unit area within the field, a threshold trigger for capturing an image for a selectable icon when an agricultural parameter exceeds a threshold for the agricultural parameter, a time based trigger for capturing images, or a burst capture of images.

8. The computer implemented method of claim 1, wherein the selectable icons are generated and overlaid at different geographic locations on the enhanced map for the field based on a threshold trigger including a weed density exceeding a threshold trigger for weed density or an emergence value exceeding a threshold trigger for emergence data.

9. A computing device comprising:

a display device for displaying a user interface having a scale region and a field region for an agricultural parameter; and one or more processors coupled to the display device, the one or more processors is configured to generate a data layer for the agricultural parameter from sensors of an agricultural implement that collects the data during an application pass for a field, to generate the user interface with an enhanced map that includes the data layer for the agricultural parameter, and to generate selectable icons or symbols overlaid at different geographic locations on the enhanced map for the field with the selectable icons representing captured images at the different geographic locations, wherein the user interface further comprises a split screen view with the enhanced map that includes the data layer for the agricultural parameter and a first scale region to show a scale for the agricultural parameter on a first side of the split screen view and an overview image of the field and a second scale region on a second side of the split screen view; and wherein the agricultural parameter comprises one or more of seed data, commanded planter seed population, actual seed population determined from a seed sensor, a seed population deviation, singulation data, weed map, emergence data, emergence map, emergence environment score based on a combination of temperature and moisture correlated to how long a seed takes to germinate, emergence environment score based on a percentage of seeds planted that will germinate within a selected number of days, time to germination, time to emergence, and seed germination risk.

10. The computing device of claim 9, wherein the user interface further comprises the split screen view with the enhanced map on the first side of the split screen view and the overview image of the field, the second scale region, and one or more of a selectable orientation option to rotate an orientation of the images of the user interface with respect to a true North direction, a selectable plus/minus zoom option, a selectable pinch to zoom option, a selectable expand option to control sizing of a displayed map in a field region, a selectable icon option to enable or disable showing image icons or symbols on the map, a selectable full map option to switch between different viewing options including a full screen view or a split screen view and a selectable statistics option to show statistics for the data layer on the second side of the split screen view.

11. The computing device of claim 9, wherein the agricultural implement comprises a planter, sprayer, or irrigation implement having row units with each row unit having a sensor for capturing images to obtain the data layer.

12. The computing device of claim 11, wherein the display device to display the user interface with the enhanced map and to receive a user input to select an icon of the enhanced map, wherein the one or more processors is configured to generate an updated user interface with the enhanced map and an image that is associated with a selected icon or symbol based on the user input with the selected icon or symbol changing color.

13. The computing device of claim 12, wherein the updated user interface to provide a selectable orientation option to rotate an orientation of the images of the user interface, a selectable expand option to control sizing of a displayed map in a field region, a selectable icon or symbol option to enable or disable showing icons or symbols on the enhanced map, a selectable full map option to switch between a full screen view of map versus a split screen view having both of a map and an overview image, and a selectable statistics option to show statistics for the data layer.

14. The computing device of claim 9, wherein the display device to receive a user input to modify the scale region and to display a modified scale region and a corresponding modified field region.

15. A computer implemented method for customizing field views of a field region comprising:

obtaining a data layer for an agricultural parameter from sensors of an agricultural implement that collects data during an application pass for a field; and generating selectable icons and overlaying the selectable icons at different geographic locations that are spaced approximately equidistant from each other on an enhanced map of the data layer for the field based on a spatial trigger to capture an image during the application pass per unit area or the geographic locations of the icons are spaced based on when an agriculture parameter compares in a predetermined manner to a threshold trigger for the agricultural parameter causing an image to be captured for each icon; and wherein the agricultural parameter comprises one or more of seed data, commanded planter seed population, actual seed population determined from a seed sensor, a seed population deviation, singulation data, weed map, emergence data, emergence map, emergence environment score based on a combination of temperature and moisture correlated to how long a seed takes to germinate, emergence environment score based on a percentage of seeds planted that will germinate within a selected number of days, time to germination, time to emergence, and seed germination risk.

16. The computer implemented method of claim 15, further comprising: comparing the agricultural parameter to the threshold trigger; determining whether the agricultural parameter exceeds the threshold trigger for a location within the field; and generating a selectable icon when the agricultural parameter exceeds the threshold trigger for the location within the field.

17. The computer implemented method of claim 16, wherein the threshold trigger comprises a weed threshold that is compared to a weed density.

18. The computer implemented method of claim 16, wherein the threshold trigger comprises an emergence threshold that is compared to an emergence value for plant emergence data.

19. The computer implemented method of claim 15, further comprising:

displaying a user interface with the enhanced map that includes the data layer for the agricultural parameter and the selectable icons overlaid at different geographic locations on the enhanced map for the field.

20. The computer implemented method of claim 15, wherein the agricultural implement comprises a planter, sprayer, or irrigation implement having row units with each row unit having a sensor for capturing images to obtain the data layer.

* * * * *